(12) United States Patent
Matsuoka et al.

(10) Patent No.: US 7,563,524 B2
(45) Date of Patent: Jul. 21, 2009

(54) FUEL CELL SYSTEM

(75) Inventors: Kei Matsuoka, Kawasaki (JP); Masato Akita, Yokohama (JP); Hiroaki Hirazawa, Inagi (JP); Yuusuke Sato, Bunkyo-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 10/717,625

(22) Filed: Nov. 21, 2003

(65) Prior Publication Data

US 2004/0166389 A1 Aug. 26, 2004

(30) Foreign Application Priority Data

Nov. 22, 2002 (JP) .............................. 2002-339953

(51) Int. Cl.
*H01M 8/04* (2006.01)

(52) U.S. Cl. .............................. 429/12; 429/13; 429/26; 429/34

(58) Field of Classification Search .................... 429/12, 429/13, 26
See application file for complete search history.

(56) References Cited

U.S. PATENT DOCUMENTS

| | | | | |
|---|---|---|---|---|
| 4,629,664 A | * | 12/1986 | Tsukui et al. .................. | 429/23 |
| 4,670,359 A | * | 6/1987 | Beshty et al. .................. | 429/17 |
| 6,303,244 B1 | * | 10/2001 | Surampudi et al. ............. | 429/17 |
| 6,641,944 B2 | * | 11/2003 | Kawasumi et al. ............. | 429/19 |
| 6,977,118 B1 | * | 12/2005 | Von Andrian .................. | 429/13 |
| 2002/0119352 A1 | * | 8/2002 | Baldauf et al. ................. | 429/13 |

FOREIGN PATENT DOCUMENTS

| | | |
|---|---|---|
| JP | 57-019973 | 2/1982 |
| JP | 57-123661 | 8/1982 |
| JP | 58-165274 | 9/1983 |
| JP | 4-229957 | 8/1992 |
| JP | 5-258760 | 10/1993 |
| JP | 6-65054 | 8/1994 |
| JP | 2000-260456 | 9/2000 |
| JP | 2002-505507 | 2/2002 |
| JP | 2002-110199 | 4/2002 |
| JP | 2002-319420 | 10/2002 |
| JP | 2002-373684 | 12/2002 |
| JP | 2004-146370 | 5/2004 |

* cited by examiner

*Primary Examiner*—Jane Rhee
(74) *Attorney, Agent, or Firm*—Oblon, Spivak, McClelland, Maier & Neustadt, P.C.

(57) ABSTRACT

A fuel cell system is provided with a direct methanol fuel cell having an anode, a cathode and an electrolyte membrane put therebetween, a fuel supply unit supplying fuel to the anode, an air supply unit supplying air to the cathode and a heat exchanger exchanging heat between the fuel supplied by the fuel supply unit to the anode and an exhaust exhausted from the fuel cell.

14 Claims, 30 Drawing Sheets

FUEL CELL SYSTEM

CROSS-REFERENCE TO RELATED APPLICATIONS

This application is based upon and claims the benefit of priority from the prior Japanese Patent Application No. 2002-339953 (filed Nov. 22, 2002); the entire contents of which are incorporated herein by reference.

BACKGROUND OF THE INVENTION

1. Field of the Invention

The present invention relates to a fuel cell system and, more specifically, a liquid fuel cell such as a direct methanol fuel cell ("DMFC"), to which a solid polymer molecule electrolyte membrane is applied, directly employing a liquid organic compound, such as methanol, as fuel so as to generate electric power.

2. Description of the Related Art

As a fuel for a fuel cell, methanol is relatively cheap and can be easily dealt with. DMFC can employ the methanol without reforming to generate electric power. Therefore, compared with conventional fuel cells, DMFC has an advantage that a reformer for fuel thereof can be omitted and the constitution can be simple. Additionally, DMFC uses a solid polymer molecule electrolyte which is far more manageable than a liquid electrolyte such as a solution of sulfuric acid or potassium oxide. More specifically, DMFC has a performance advantage over the conventional fuel cells.

The solid polymer electrolyte membrane is necessary to be humidified with water. The water can be admixed to the methanol in advance so as to be supplied to the electrolyte membrane. However, in this case, an energy concentration of the fuel cell is decreased correspondingly with a degree of dilution of the methanol. To increase the energy concentration, there is proposed an art in which an exhaust from the fuel cell is recycled so as to employ water contained therein to humidify the electrolyte membrane.

A related art is disclosed in Japanese Patent Application Laid-open No. 2002-110199, in which an exhaust from a cathode and an anode is recovered and recycled.

SUMMARY OF THE INVENTION

The exhaust from the cathode and the anode includes liquid fractions such as unreacted methanol, formic acid and formic aldehyde as well as water and has a relatively high temperature. The exhaust is flown through a gas-liquid separation membrane so that the liquid fractions are recovered from the exhaust. However, in a case where a temperature of the exhaust is high enough, the unreacted methanol, the formic acid and the formic aldehyde are partly evaporated and, therefore, are exhausted out of the fuel cell system. Therefore temperature control of the exhaust is one of the important technical problems of DMFC employing concentrated methanol.

There are proposed fuel cells to which appropriate liquid organic compounds similar to methanol, for example, dimethyl ether, formic acid and such, are employed as fuel without reforming. Throughout the present specification, such fuel cell to which any liquid organic compound is employed as fuel without reforming is called "liquid fuel cell". The liquid fuel cell has similar advantage and problem with the DMFC.

The present invention is intended for solving the above problem of the liquid fuel cell.

According to a first aspect of the present invention, a fuel cell system is provided with a fuel cell having an anode, a cathode and an electrolyte membrane put therebetween, a fuel supply unit supplying fuel to the anode, an air supply unit supplying air to the cathode and a heat exchanger exchanging heat between the fuel supplied by the fuel supply unit to the anode and an exhaust exhausted from the fuel cell.

According to a second aspect of the present invention, a fuel cell system is provided with a fuel cell having an anode, a cathode and an electrolyte membrane put therebetween, a fuel supply unit including a mixing container mixing fuel and an exhaust exhausted from the fuel cell so as to form a mixture, the mixture being supplied to the anode, an air supply unit supplying air to the cathode and a heat exchanger connected to the mixing container so as to exchange heat between ambient air and the mixture.

According to a third aspect of the present invention, a fuel cell system is provided with a fuel cell having an anode, a cathode and an electrolyte membrane put therebetween, a fuel supply unit including a mixing container mixing fuel and an exhaust exhausted from the fuel cell so as to form a mixture, the mixture being supplied to the anode, an air supply unit supplying air to the cathode, a heat exchanger exposed to an ambient air and a circulation unit circulating the mixture between the mixing container and the heat exchanger so as to exchange heat between the ambient air and the mixture.

DETAILED DESCRIPTION OF THE INVENTION

Figure 1:
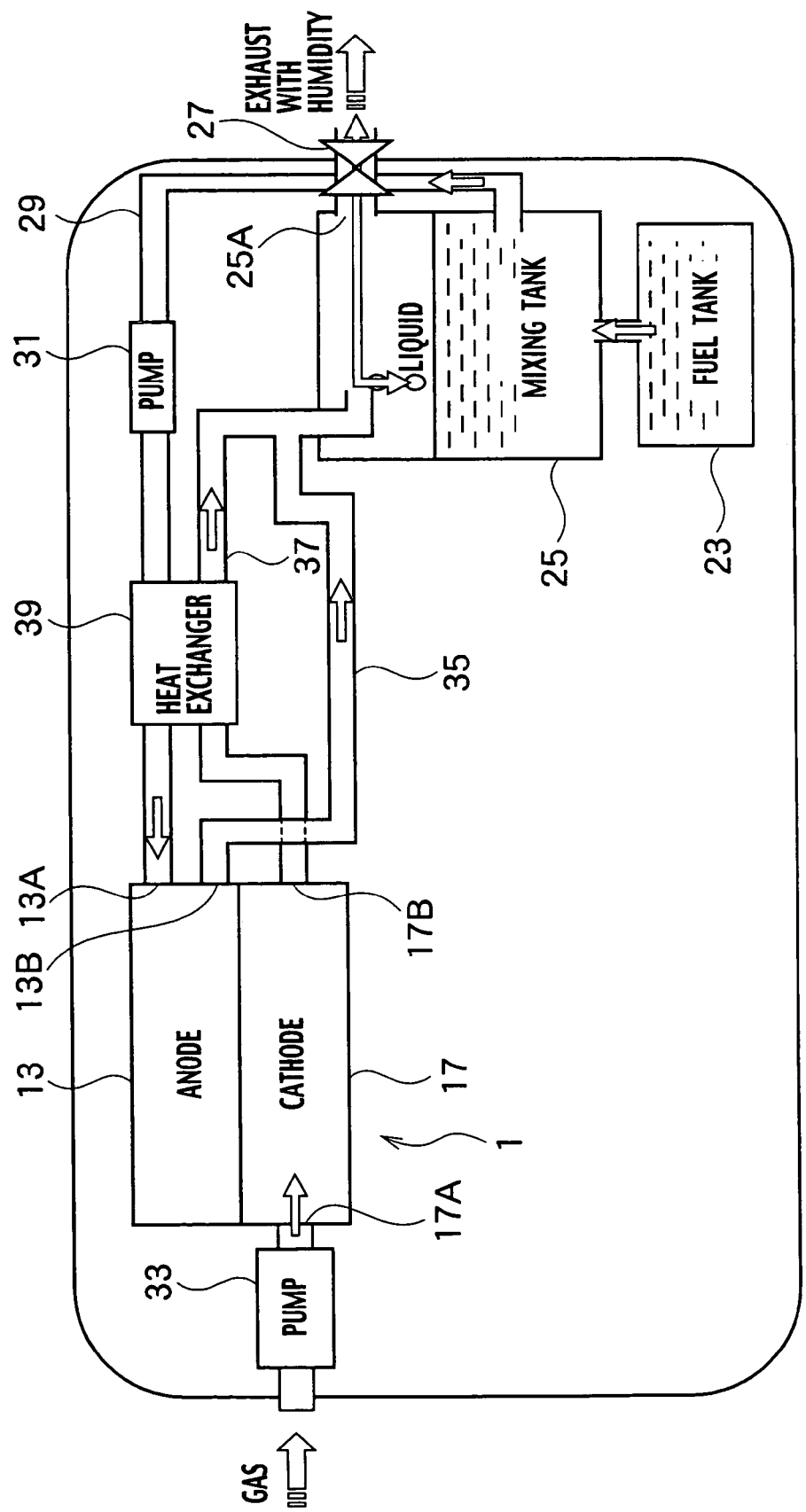
FIG. 1 is a schematic drawing of a fuel cell system according to a first embodiment of the present invention.

A direct methanol fuel cell ("DMFC" hereinafter) 1 is provided with a membrane electrode assembly ("MEA" hereinafter) 7 which is provided with a polymer electrolyte membrane 3 and a pair of catalyst electrodes 5, as a cathode and an anode, respectively layered on a front surface and a back surface thereof. A pair of packings 9A and 9B surrounding the catalyst electrodes 5 are disposed on both sides of the polymer electrolyte membrane 3. The MEA 7 with the packings 9A and 9B are put between a separator 13 having a flow path 11 for flowing methanol aqueous solution as fuel and a separator 17 having a flow path 15 for flowing air. The separator 13 is provided with an inlet port 13A for inflow of the fuel and an outlet port 13B for outflow. The separator 17 is similarly provided with an inlet port 17A for inflow of the air and an outlet port 17B for outflow.

Figure 30A:
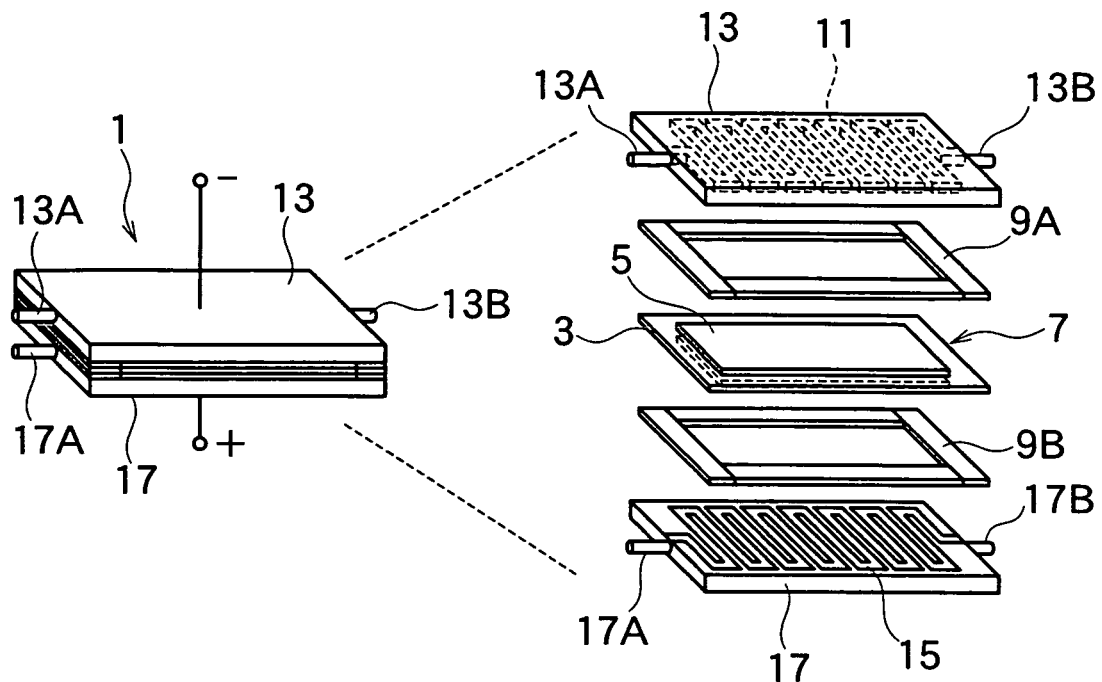
FIG. 30A is an exploded perspective view showing a general constitution of a fuel cell.
Figure 30B:
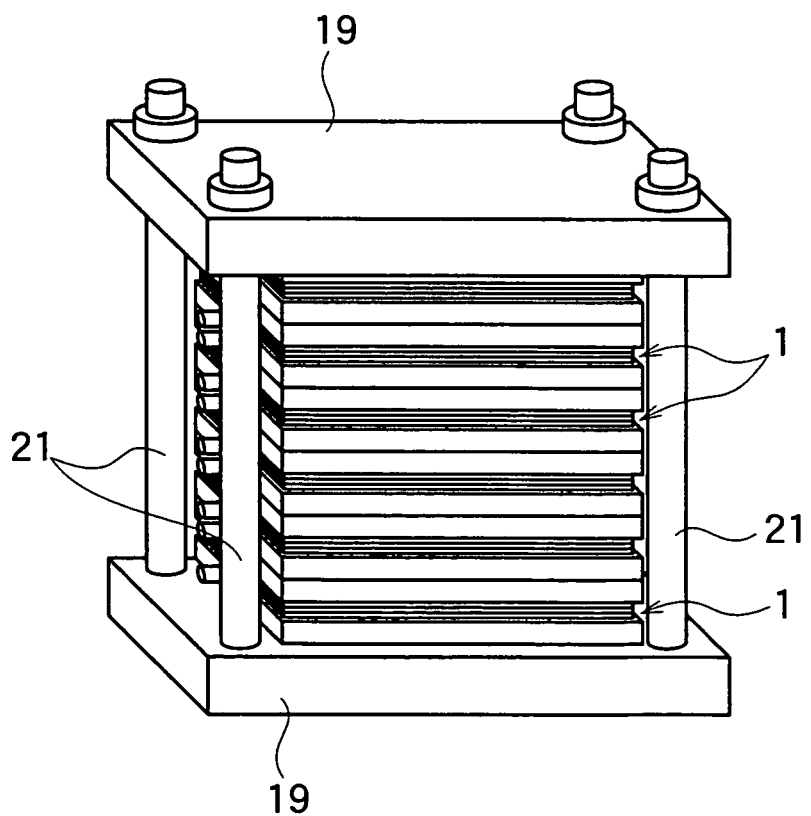
FIG. 30B is a perspective view of a stack structure of the fuel cells.

In general, a plurality of the fuel cells 1 are stacked to form a stack structure as shown in FIG. 30B to increase generating electric power. The stack structure is fixed with a pair of plates 19 and a plurality of fastening members 21.

The present invention is applied to the fuel cell 1 to form a fuel cell system.

Certain embodiments of the present invention will be described hereinafter with reference to FIGS. 1-29. In these descriptions and drawings, an anode is described as integrated with a separator 13 and a cathode is described as integrated with a separator 17. Therefore they are described as an anode 13 and a cathode 17.

A first embodiment of the present invention will be described hereinafter with reference to FIG. 1. In the constitution, a fuel tank 23 pooling methanol is provided. The fuel tank 23 is connected to a mixing tank 25.

The mixing tank 25 is provided with a gas-liquid separation membrane (not shown) which blocks penetration of liquid and allows penetration of gas. The mixing tank 25 recovers liquid from an exhaust from the anode 13 and the cathode 17 by means of the gas-liquid separation membrane. The recovered liquid is admixed with the methanol supplied by the fuel tank 23 so as to form a mixture. The gas separated from the liquid is exhausted from the mixing tank 25 via a regulating valve 27. Internal pressure of the mixing tank 25 can be regulated by the regulating valve 27.

A fuel supply path 29 is connected to the mixing tank 25 and is provided with a pump 31. The pump 31 delivers the mixture to the anode 13 via the inlet port 13A. For delivering an oxidant containing gas (in general, air), a pump 33 is further provided and is connected to the cathode 17.

The outlet port 13B of the anode 13 is connected to the mixing tank 25 via an anode exhaust path 35 so as to recover the exhaust from the anode 13. The outlet port 17B of the cathode 17 is similarly connected to the mixing tank 25 via a cathode exhaust path 37.

The fuel cell system is further provided with a heat exchanger 39. The fuel supply path 29 and the cathode exhaust path 37 pass through the heat exchanger 39.

The heat exchanger 39 exchanges heat contained in the exhaust flowing out of the cathode 17 with the mixture flowing into the fuel supply path 29. Thereby the mixture is heated to flow into the anode 13 and the exhaust is cooled to flow into the mixing tank 25.

The aforementioned constitution effectively keeps the temperature of the mixture in the mixing tank 25 at a relatively low temperature (below 50° C. at the highest) without any cooling means. The constitution further makes it possible to rapidly heat the anode 13 up to an appropriate temperature (between 50° C. and 90° C.) without any heating means.

Therefore the liquid fractions contained in the exhaust are effectively prevented from exhausting out.

Figure 2:
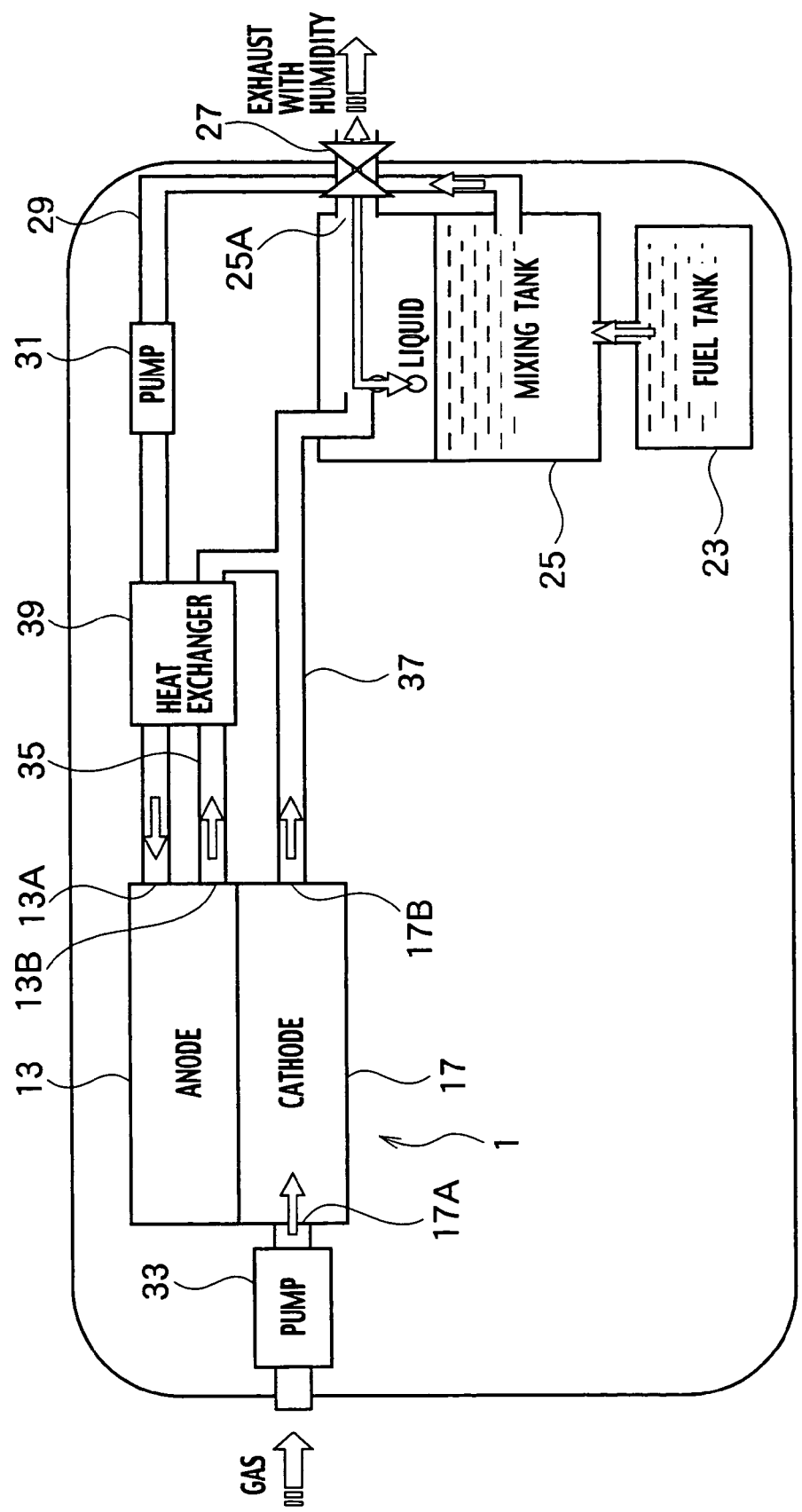
FIG. 2 is a schematic drawing of a fuel cell system according to a second embodiment of the present invention.

A second embodiment of the present invention will be described hereinafter with reference to FIG. 2. In the second embodiment, the same elements as the aforementioned first embodiment are referenced with the same numerals and the detailed descriptions are omitted.

In the second embodiment, the anode exhaust path 35, instead of the cathode exhaust path 37, passes through the heat exchanger 39 so that heat contained in the exhaust flowing out of the anode 13 is exchanged with the mixture flowing into the fuel supply path 29.

The constitution according to the second embodiment brings about the same effect as the aforementioned first embodiment.

Figure 3:
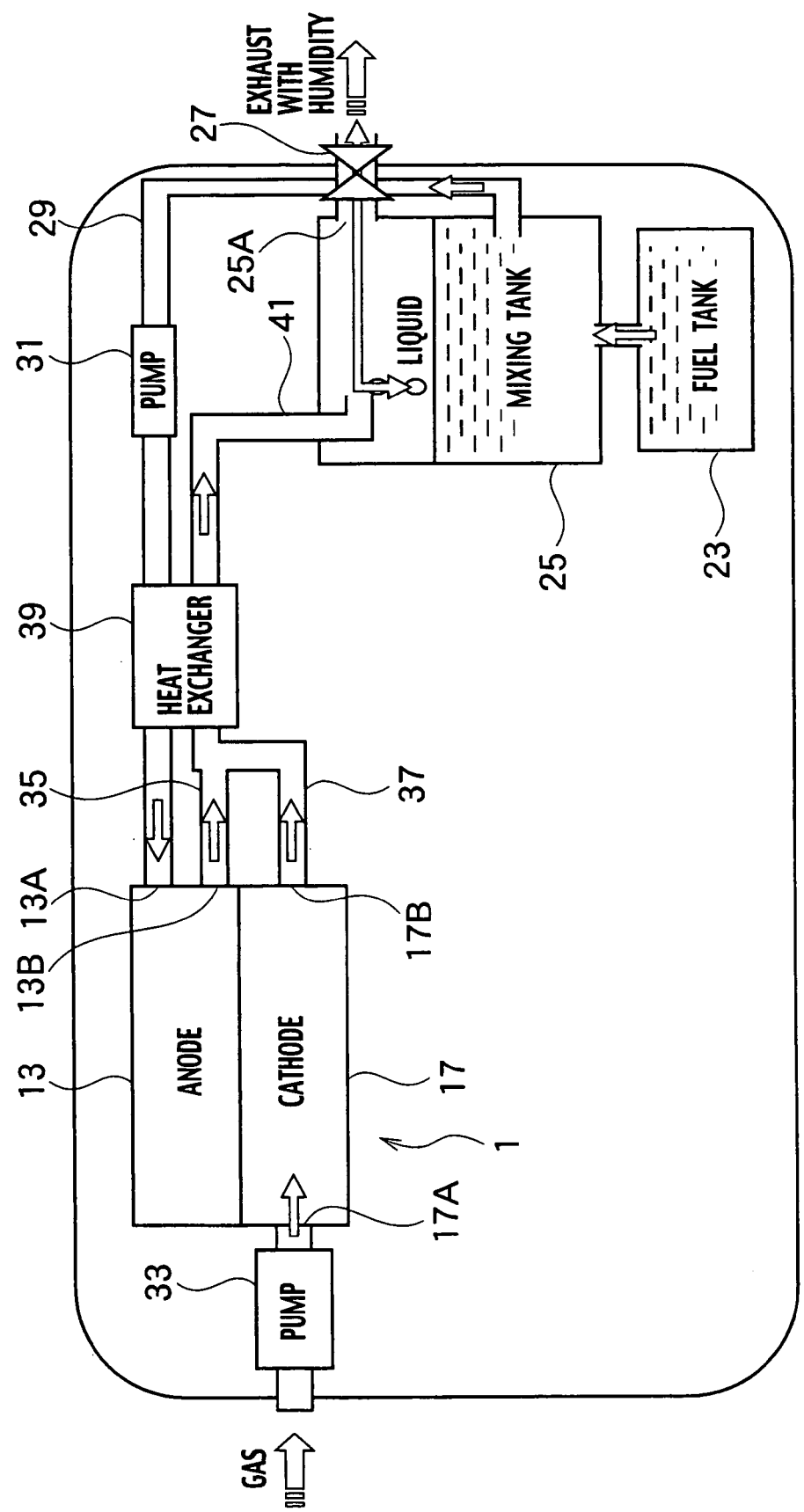
FIG. 3 is a schematic drawing of a fuel cell system according to a third embodiment of the present invention.

A third embodiment of the present invention will be described hereinafter with reference to FIG. 3. In the third embodiment, the same elements as the aforementioned embodiments are referenced with the same numerals and the detailed descriptions are omitted.

In the third embodiment, the cathode exhaust path 37 and the anode exhaust path 35 are merged into a merged exhaust path 41. The merged exhaust path 41 passes through the heat exchanger 39 so that heat contained in the exhaust flowing out of the cathode 17 and the anode 13 is exchanged with the mixture flowing into the fuel supply path 29.

The constitution according to the third embodiment brings about a similar effect with the aforementioned first and second embodiment, however, the heat exchange is more effectively achieved.

Figure 4:
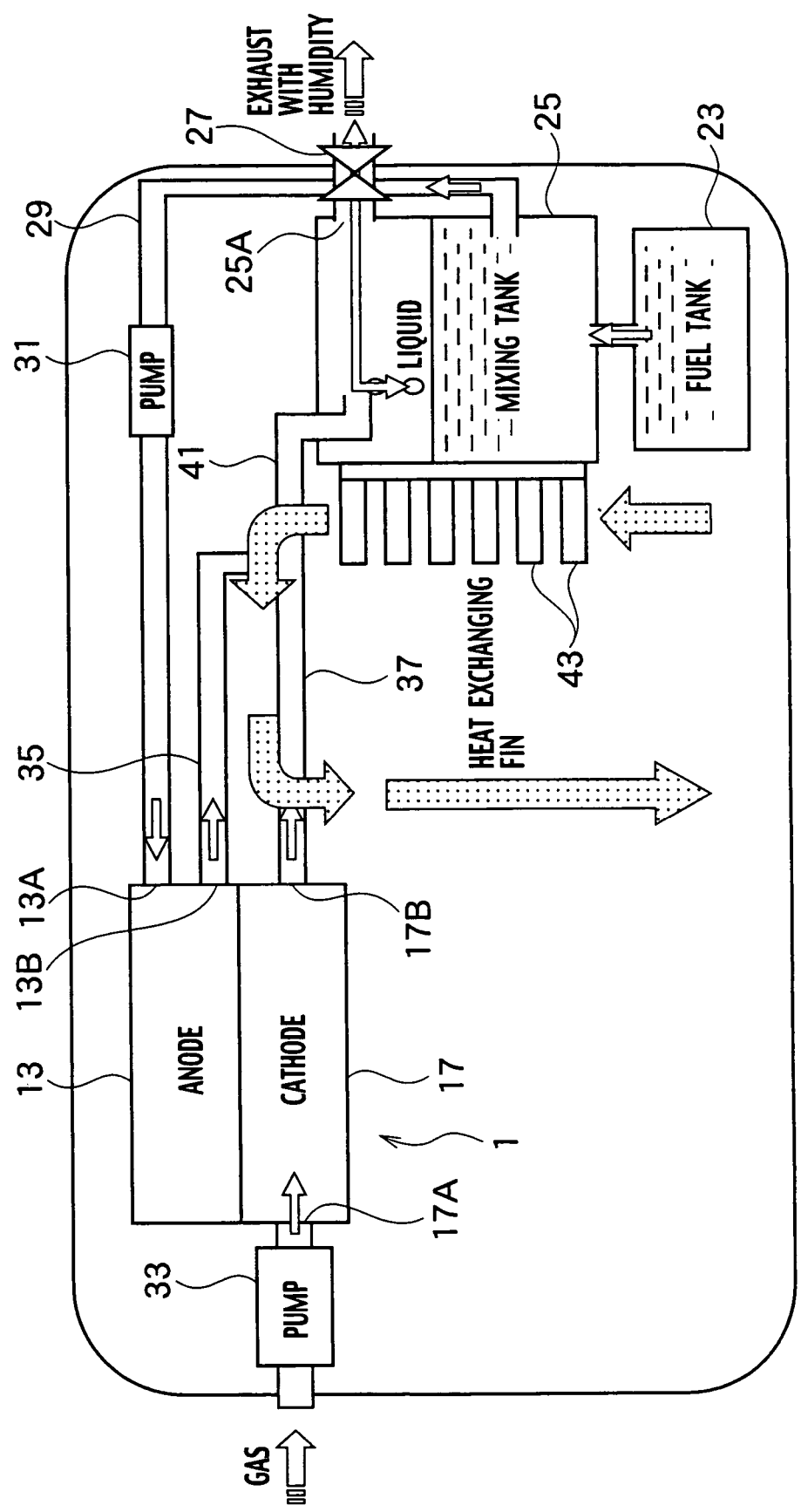
FIG. 4 is a schematic drawing of a fuel cell system according to a fourth embodiment of the present invention.

A fourth embodiment of the present invention will be described hereinafter with reference to FIG. 4. In the fourth embodiment, the same elements as the aforementioned embodiments are referenced with the same numerals and the detailed descriptions are omitted.

In the fourth embodiment, the constitution of the fuel supply path 29, the cathode exhaust path 37 and the anode exhaust path 35 is as same as the aforementioned embodiments, however, the heat exchanger 39 is omitted. Instead of the heat exchanger 39, a heat exchanging fin 43 is connected with the mixing tank 25. The heat exchanging fin 43 exchanges heat of the mixture in the mixing tank 25 with ambient air. The mixture is cooled so that the liquid fractions contained in the exhaust are prevented from being evaporated and exhausting out.

Figure 5:
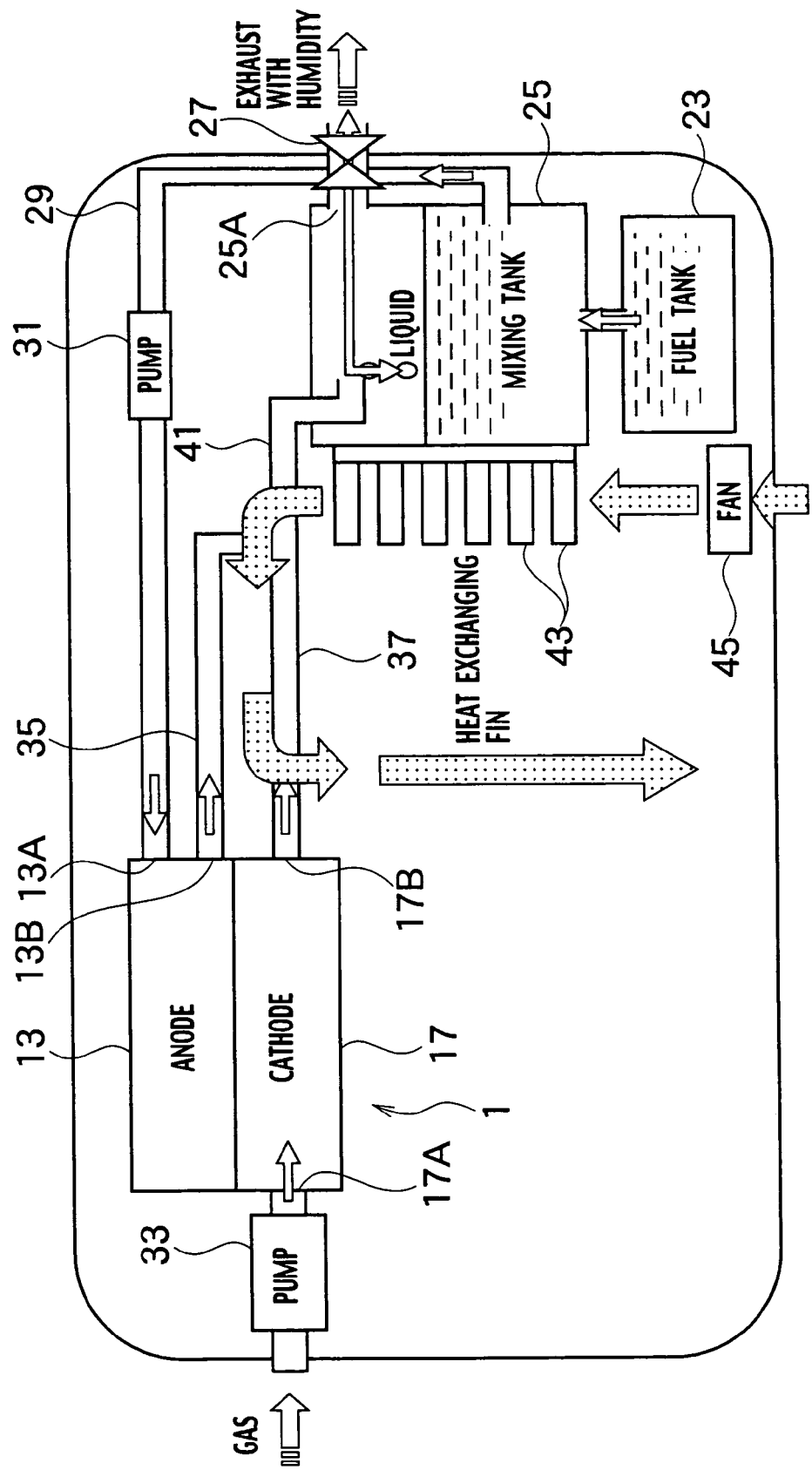
FIG. 5 is a schematic drawing of a fuel cell system according to a fifth embodiment of the present invention.

A fifth embodiment of the present invention will be described hereinafter with reference to FIG. 5. In the fifth embodiment, the same elements as the aforementioned embodiments are referenced with the same numerals and the detailed descriptions are omitted.

In the fifth embodiment, a fan 45 is further provided so as to conduct ambient air to the heat exchanging fin 43 as compared with the aforementioned fourth embodiment. By means of the fan 45, the mixture is more effectively cooled. Therefore the liquid fractions contained in the exhaust are more effectively prevented from exhausting out.

Figure 6:
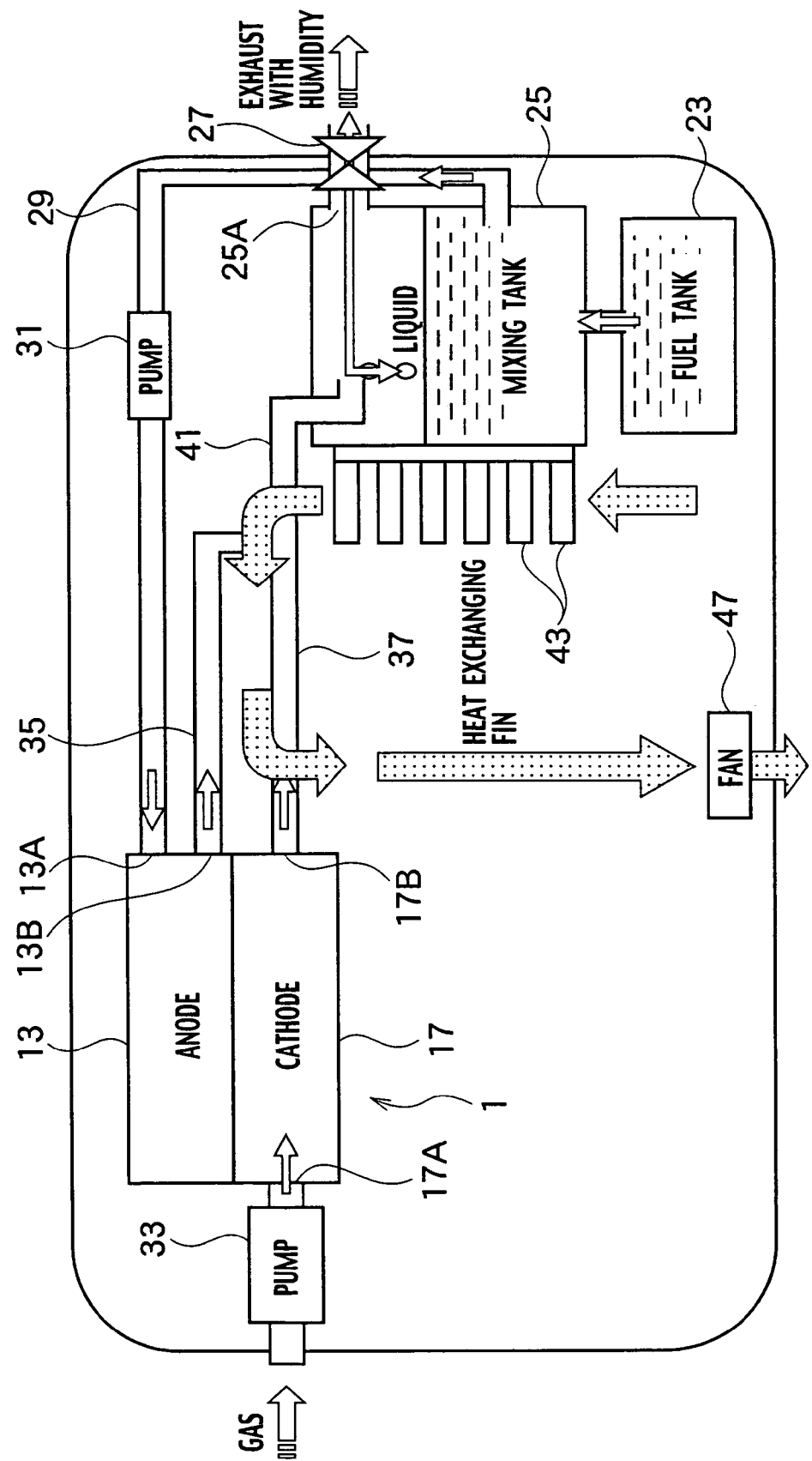
FIG. 6 is a schematic drawing of a fuel cell system according to a sixth embodiment of the present invention.

A sixth embodiment of the present invention will be described hereinafter with reference to FIG. 6. In the sixth embodiment, the same elements as the aforementioned embodiments are referenced with the same numerals and the detailed descriptions are omitted.

In the sixth embodiment, a fan 47 is further provided so as to exhaust internal air out of the fuel cell system as compared with the aforementioned fourth embodiment. By means of the fan 47, air flow around the heat exchanging fin 43 is improved so that the mixture is more effectively cooled. Therefore the liquid fractions contained in the exhaust are more effectively prevented from exhausting out.

Figure 7:
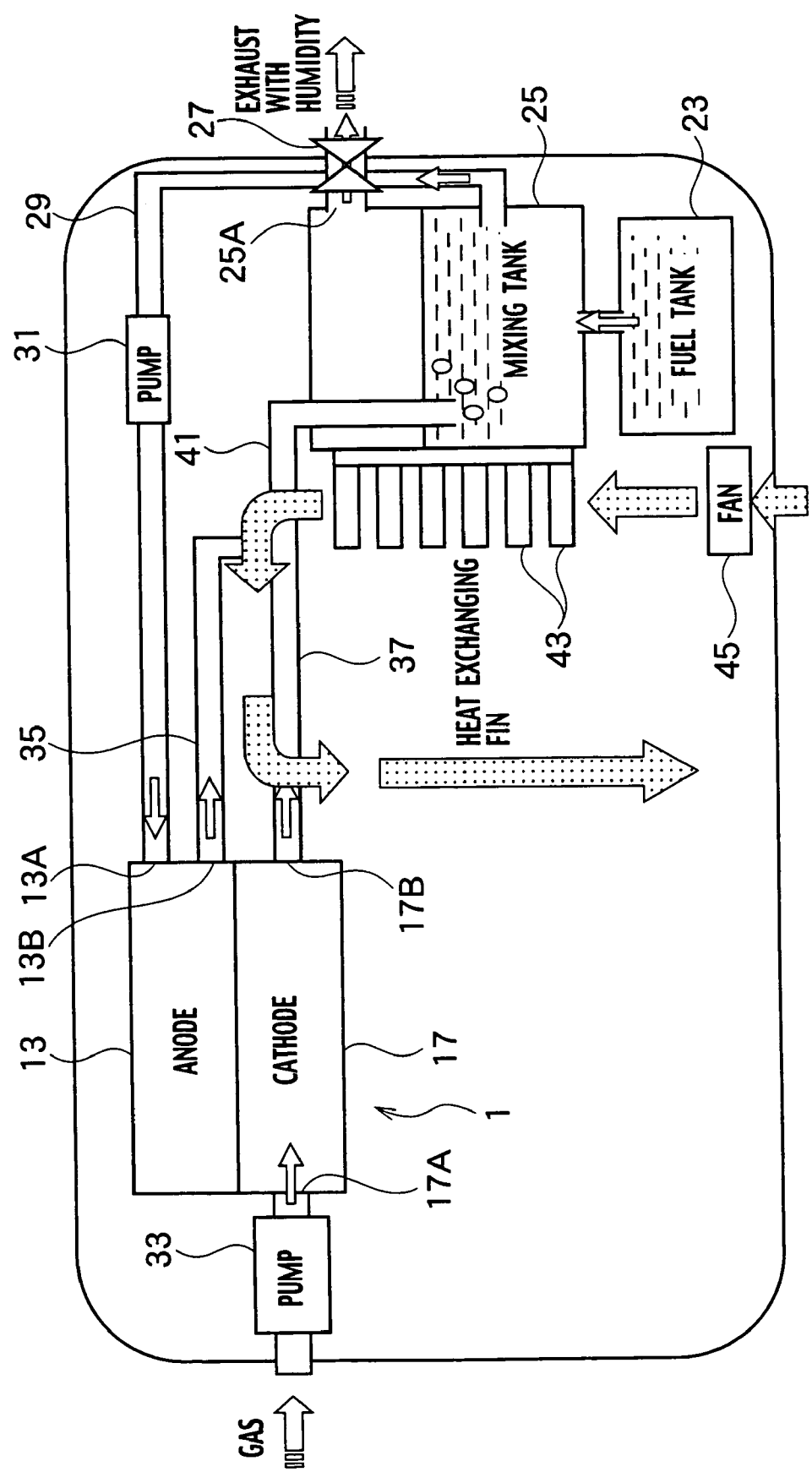
FIG. 7 is a schematic drawing of a fuel cell system according to a seventh embodiment of the present invention.

A seventh embodiment of the present invention will be described hereinafter with reference to FIG. 7. In the seventh embodiment, the same elements as the aforementioned embodiments are referenced with the same numerals and the detailed descriptions are omitted.

In the seventh embodiment, the general constitution is similar to the fifth embodiment, however, a tip end of the merged exhaust path 41 is configured to sink in the mixture pooled in the mixing tank 25.

The merged exhaust path 41 is configured such that the exhaust goes through the mixture in the mixing tank 25 and makes continuous bubbles. In the course of going through the mixture, the liquid fractions contained in the exhaust are separated from the gas fractions so as to be mixed with the mixture. Therefore the gas-liquid separation is effectively achieved and the liquid fractions contained in the exhaust are more effectively prevented from exhausting out.

Figure 8:
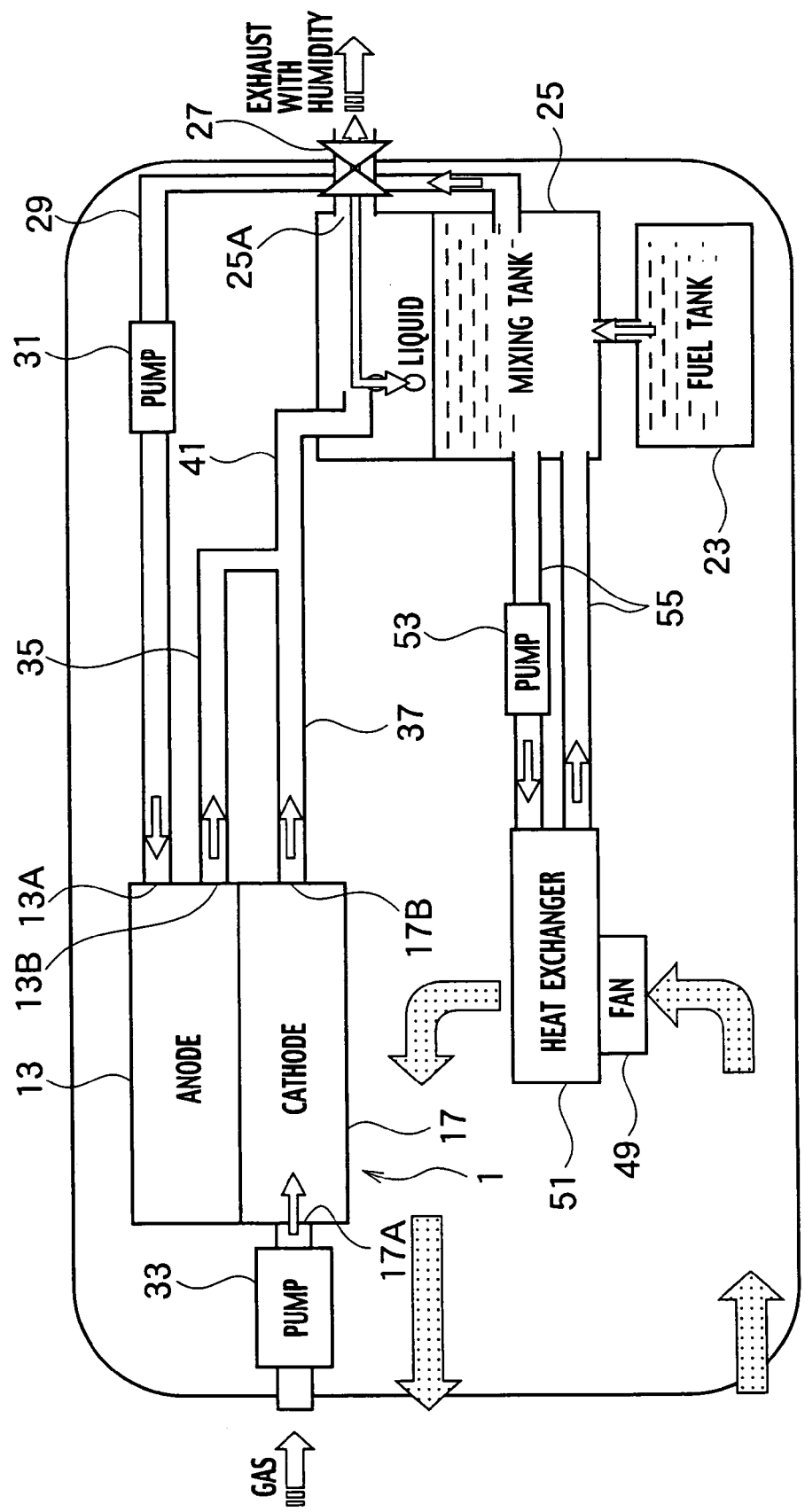
FIG. 8 is a schematic drawing of a fuel cell system according to an eighth embodiment of the present invention.

An eighth embodiment of the present invention will be described hereinafter with reference to FIG. 8. In the eighth embodiment, the same elements as the aforementioned embodiments are referenced with the same numerals and the detailed descriptions are omitted.

In the eighth embodiment, the constitution of the fuel supply path 29, the cathode exhaust path 37 and the anode exhaust path 35 is as same as the aforementioned fourth embodiment. However, the mixing tank 25 is provided with a circulation flow path 55, a pump 53, a heat exchanger 51 and a fan 49. The pump 53 circulates the mixture in the mixing tank 25 through the circulation flow path 55 and the heat exchanger 51. The heat exchanger 51 exchanges heat of the mixture with ambient air. The fan 49 conducts ambient air to the heat exchanger 51 so as to promote the heat exchange.

The aforementioned constitution effectively controls the temperature of the mixture in the mixing tank 25.

Figure 9:
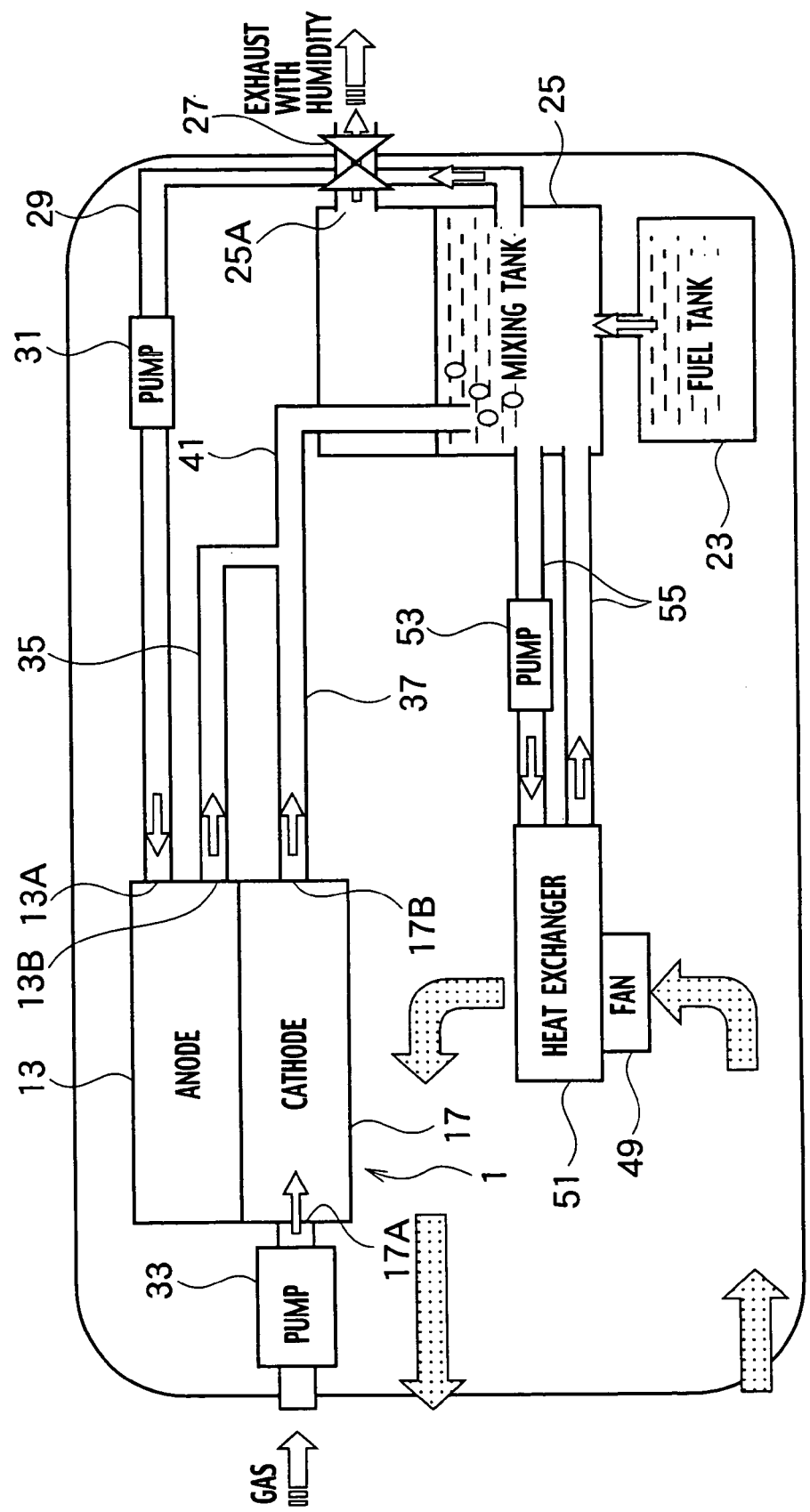
FIG. 9 is a schematic drawing of a fuel cell system according to a ninth embodiment of the present invention.

A ninth embodiment of the present invention will be described hereinafter with reference to FIG. 9. In the ninth embodiment, the same elements as the aforementioned embodiments are referenced with the same numerals and the detailed descriptions are omitted.

In the ninth embodiment, the general constitution is similar to the eighth embodiment, however, a tip end of the merged exhaust path 41 is configured to sink in the mixture pooled in the mixing tank 25.

The constitution according to the ninth embodiment brings about a similar effect with the seventh embodiment as well as the eighth embodiment. The gas-liquid separation is effectively achieved and the liquid fractions contained in the exhaust are more effectively prevented from exhausting out.

Figure 10:
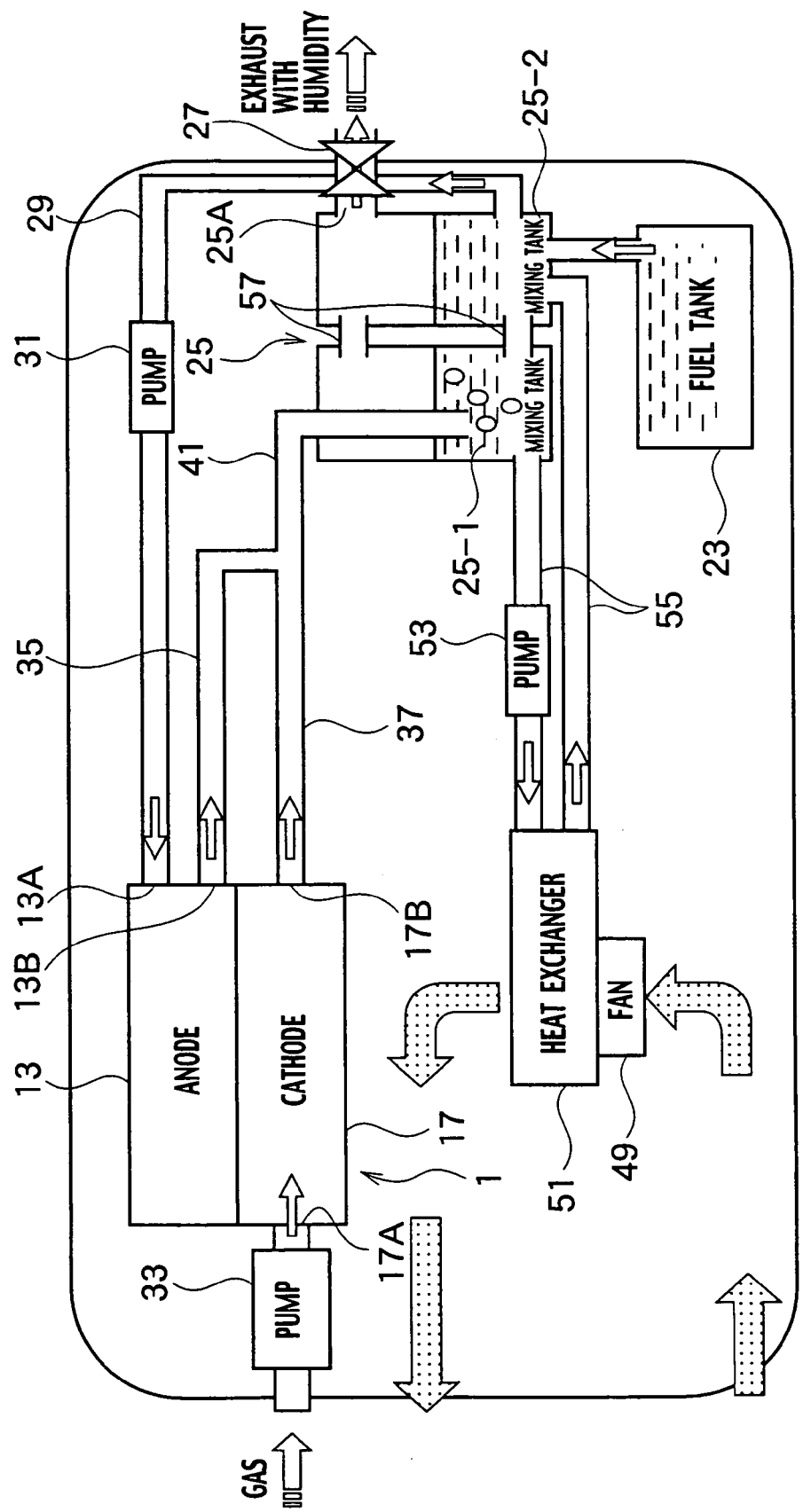
FIG. 10 is a schematic drawing of a fuel cell system according to a tenth embodiment of the present invention.

A tenth embodiment of the present invention will be described hereinafter with reference to FIG. 10. In the tenth embodiment, the same elements as the aforementioned embodiments are referenced with the same numerals and the detailed descriptions are omitted.

In the tenth embodiment, the mixing tank 25 is partitioned into a first mixing tank 25-1 and a second mixing tank 25-2 as compared with the aforementioned ninth embodiment. The first mixing tank 25-1 and the second mixing tank 25-2 are communicated via two communication tubes 57, one of which is disposed above the liquid level and another of which is below the liquid level. The merged exhaust path 41 is connected to the first mixing tank 25-1 and the tip end thereof is sunk in the mixture. The regulating valve 27 is connected to the second mixing tank 25-2. An outward path of the circulation flow path 55 is connected to the first mixing tank 25-1 and a homeward path thereof is connected to the second mixing tank 25-2.

In the first instance, the first mixing tank 25-1 receives the exhaust from the fuel cell and the mixture therein is consequently conducted to the heat exchanger 51 so as to be cooled. The mixture conducted to the second mixing tank 25-2 is already cooled, therefore the mixture is effectively prevented from being evaporated and exhausting out. Of course, the liquid levels in the first mixing tank 25-1 and the second mixing tank 25-2 are leveled by means of the communication tubes 57.

Figure 11:
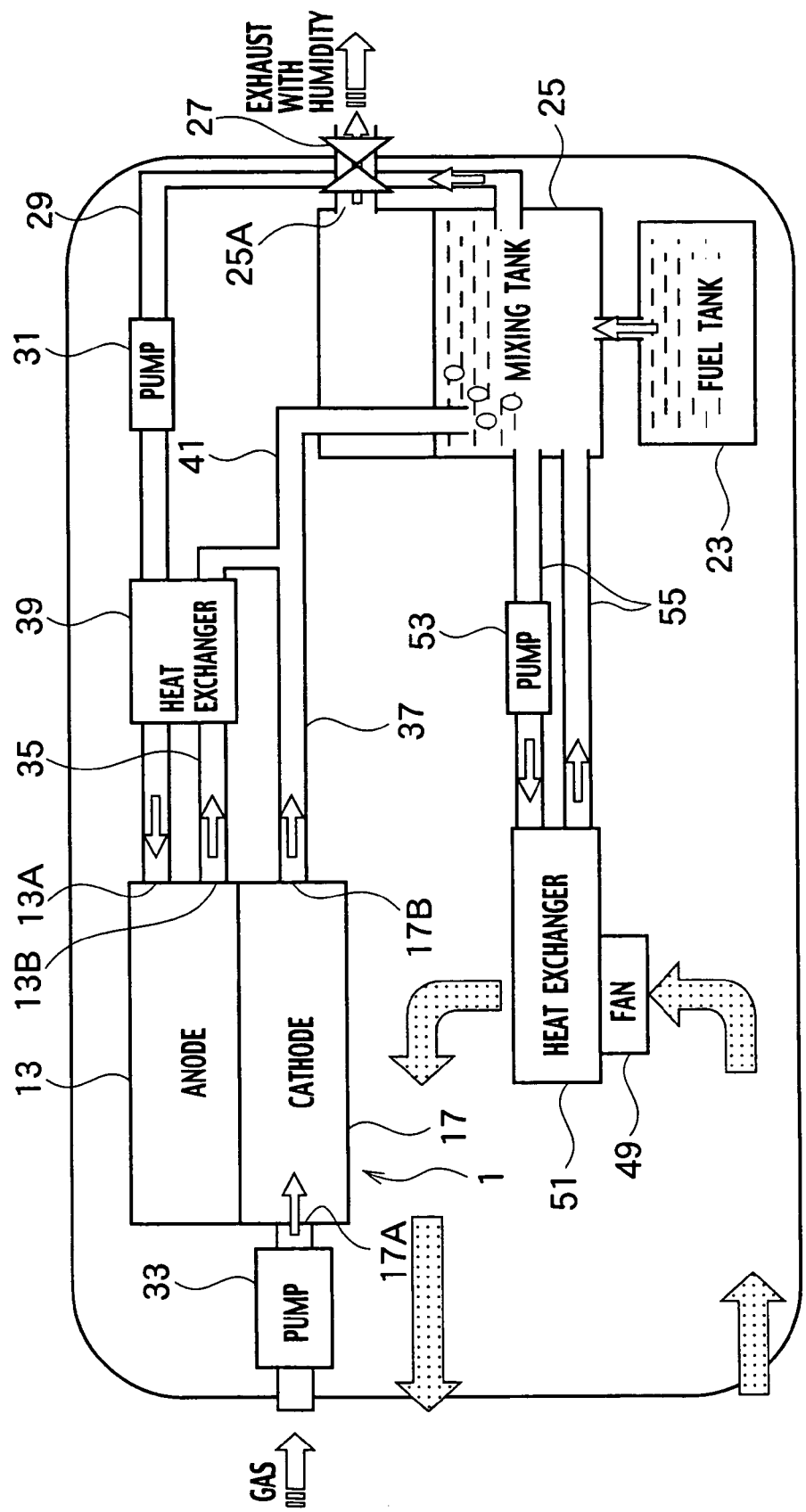
FIG. 11 is a schematic drawing of a fuel cell system according to an eleventh embodiment of the present invention.

An eleventh embodiment of the present invention will be described hereinafter with reference to FIG. 11. In the eleventh embodiment, the same elements as the aforementioned embodiments are referenced with the same numerals and the detailed descriptions are omitted.

The constitutions of the second embodiment and the ninth embodiment are combined to form the constitution of the present eleventh embodiment.

The cell reaction at the fuel cell 1 generates heat. The heat is balanced with heat output by the exhaust and heat input by the supplied fuel and such so that the temperature of the fuel cell 1 reaches to be constant. The internal pressure of the mixing tank 25 reaches to be constant by balancing pressurization of the pumps 31, 33 and depressurization of the regulating valve 27.

Furthermore, the heat generated at the fuel cell 1 is partly transported to the heat exchanger 39 and is recovered to heat the supplied fuel. The exhaust from the anode 13 is cooled instead.

The mixing tank 25 recovers liquid fractions from an exhaust from the anode 13 and the cathode 17 by means of the gas-liquid separation membrane. The recovered liquid fractions are admixed with the methanol supplied by the fuel tank 23. The gas fractions separated from the liquid fractions are exhausted from the mixing tank 25 via a regulating valve 27. Internal pressure of the mixing tank 25 can be regulated by the regulating valve 27.

A power generation experiment was carried out with the aforementioned constitution.

A sheet of carbon paper having an area of 120 cm$^2$, as a current collector, was disposed between the separator 13 and 17 of the fuel cell 1. 24 sets of the fuel cells 1 such constituted were connected in series to form a stack structure as shown in FIG. 30B. Generated power was 16 Watts.

In the course of the power generation, the pump 33 supplied 3 l/min. of ambient air having a temperature of 25° C. to the cathode 17. The methanol aqueous solution having a concentration of 1.5 mol/l and a temperature of 50° C., when pooled in the mixing tank 25, was heated up to 55° C. at the heat exchanger 39. The heated methanol aqueous solution was supplied to the anode 13 by the pump 31 at a flow rate of 17.3 ml/min.

At the same time, the pump 53 circulated 34.6 ml/min of the methanol aqueous solution pooled in the mixing tank 25 through the heat exchanger 51. The methanol aqueous solution was cooled down to 40° C. when coming back to the mixing tank 25. A temperature of the stacked fuel cells 1 was 70° C. and a fuel consumption rate was 8 cc/min.

In a case where the heat exchangers 39 and 51 are omitted as compared with the aforementioned constitution, in the same experiment condition, an operation temperature of the stacked fuel cells 1 was also 70° C., however, a temperature of the methanol aqueous solution pooled in the mixing tank 25 went up to 58° C. Methanol contained in the exhaust out of the regulating valve 27 was considerably increased and a fuel consumption rate was substantially doubled to be 16 cc/min.

In a similar manner, constitutions of any of the aforementioned embodiments can be combined.

Figure 12:
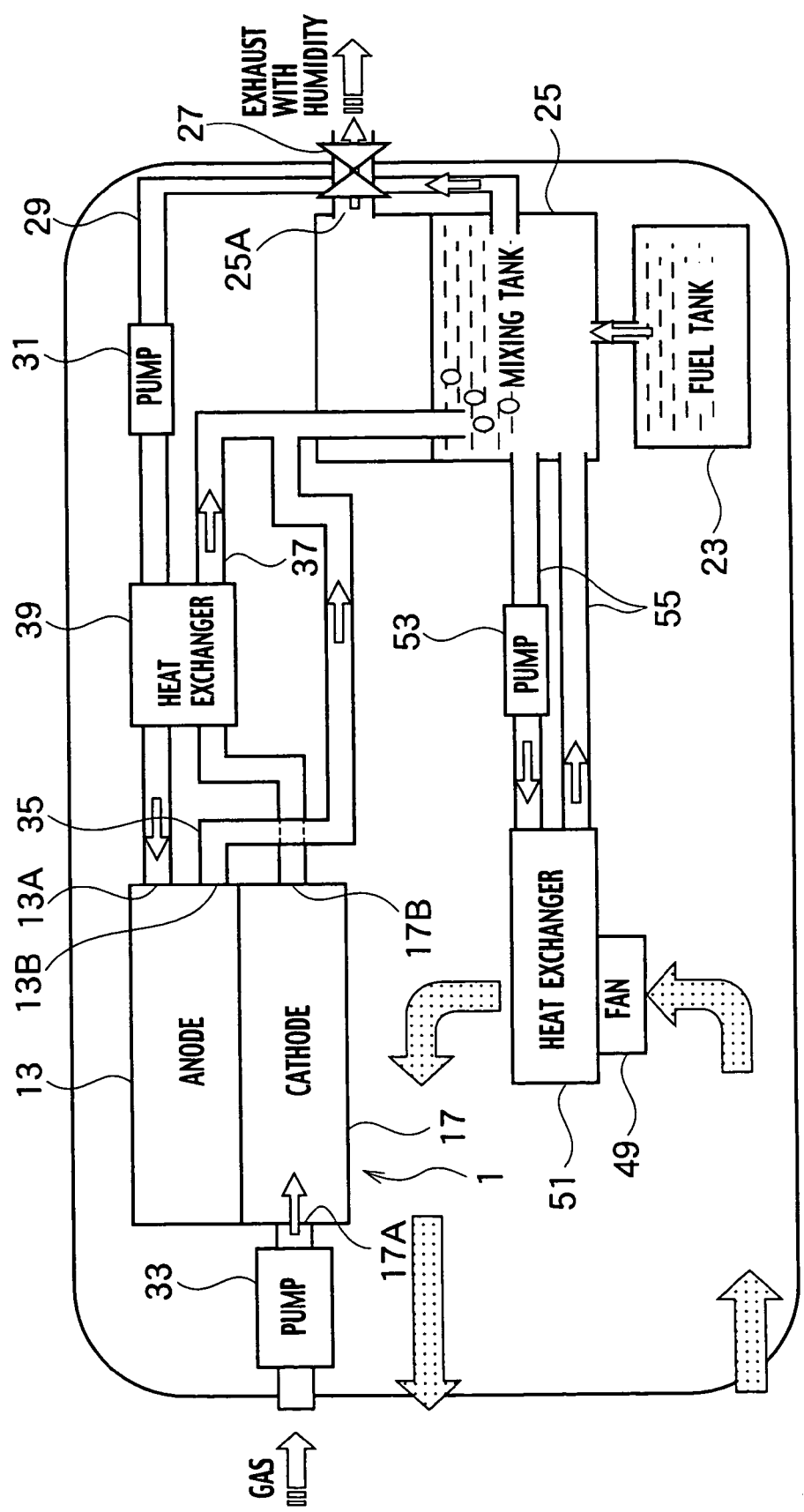
FIG. 12 is a schematic drawing of a fuel cell system according to a twelfth embodiment of the present invention.

FIG. 12 shows a constitution of a twelfth embodiment, which the constitutions of the first embodiment and the ninth embodiment are combined to form.

Figure 13:
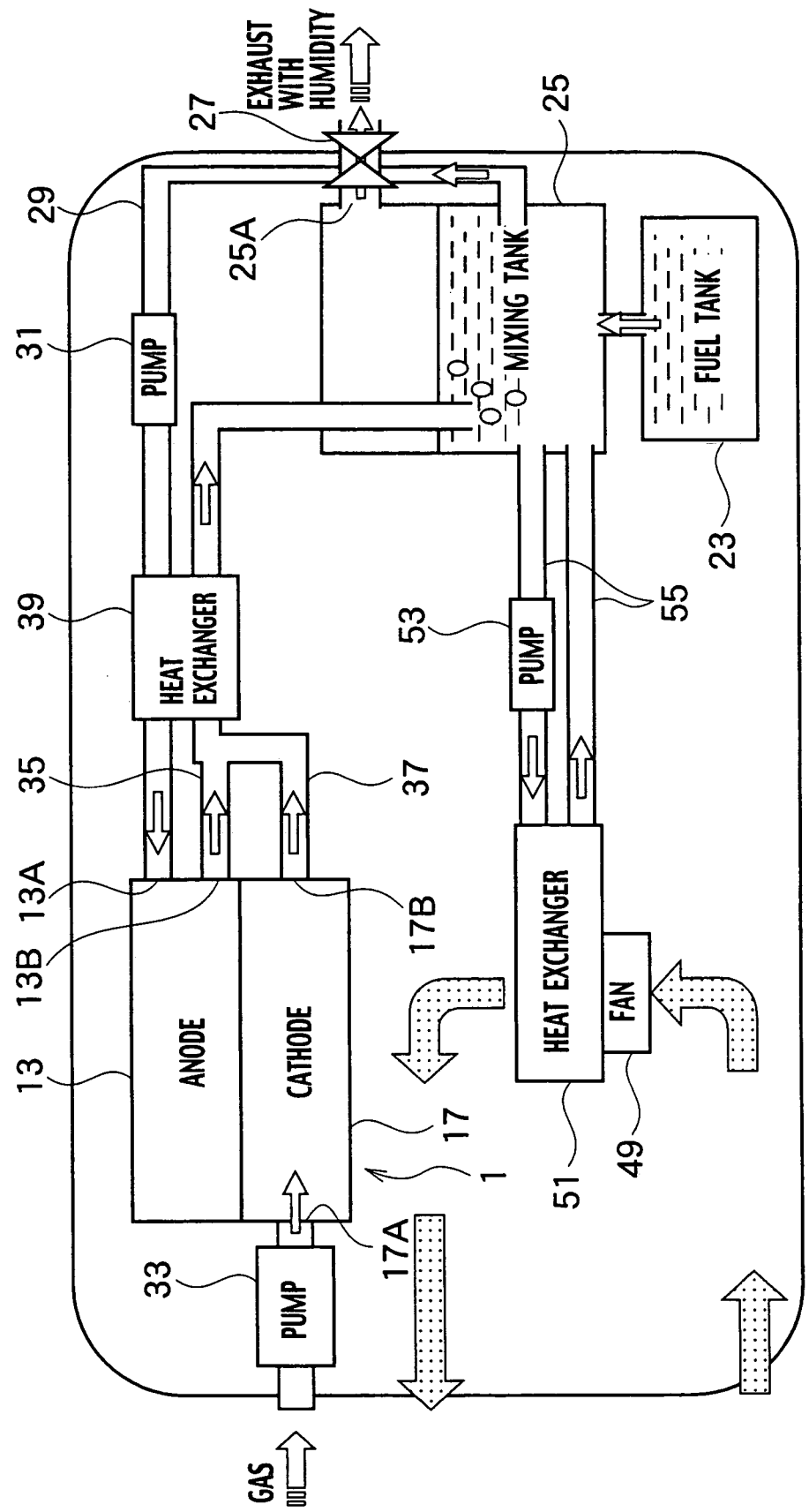
FIG. 13 is a schematic drawing of a fuel cell system according to a thirteenth embodiment of the present invention.

FIG. 13 shows a constitution of a thirteenth embodiment, which the constitutions of the third embodiment and the ninth embodiment are combined to form.

Figure 14:
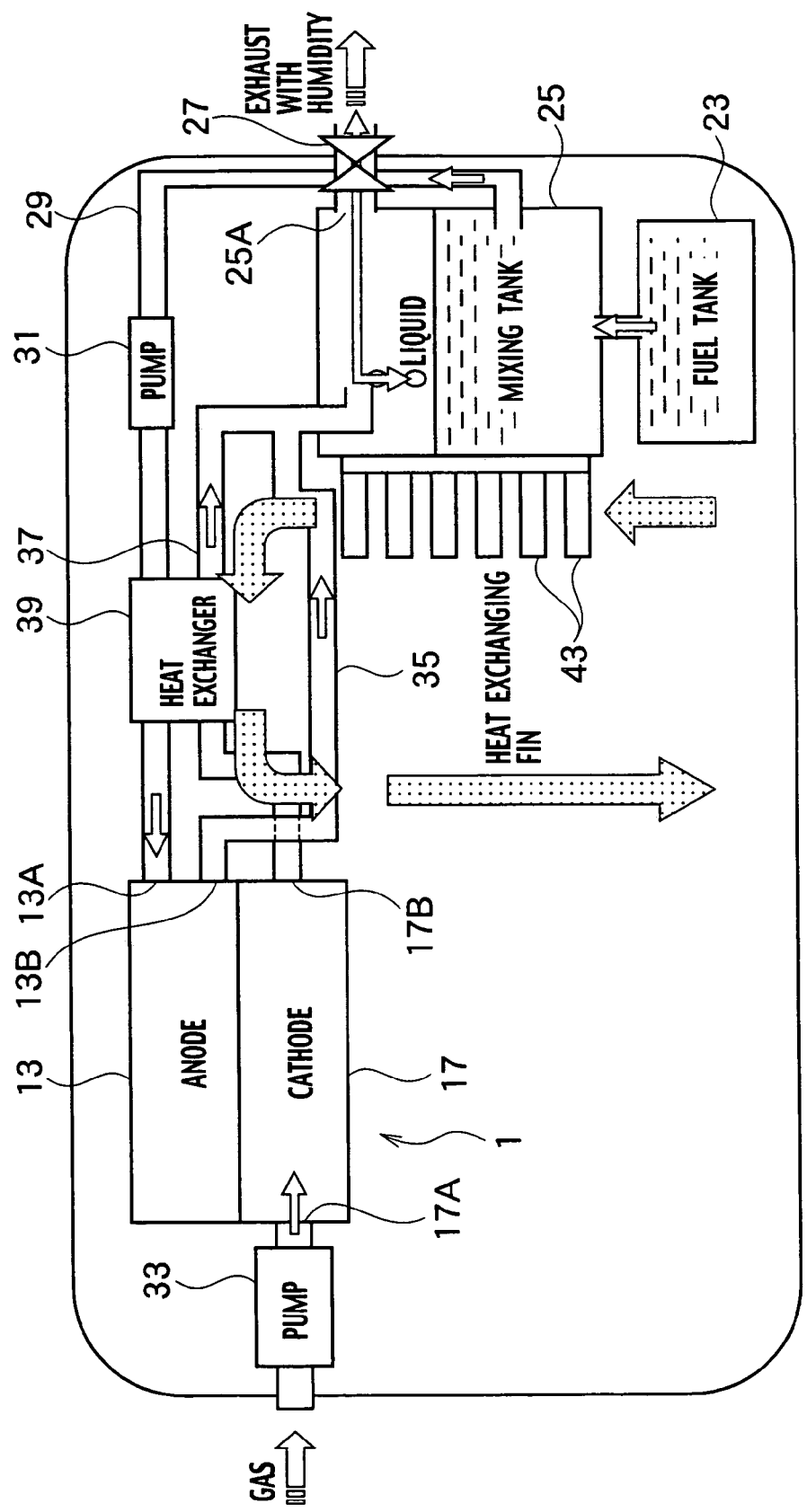
FIG. 14 is a schematic drawing of a fuel cell system according to a fourteenth embodiment of the present invention.

FIG. 14 shows a constitution of a fourteenth embodiment, which the constitutions of the first embodiment and the fourth embodiment are combined to form.

Figure 15:
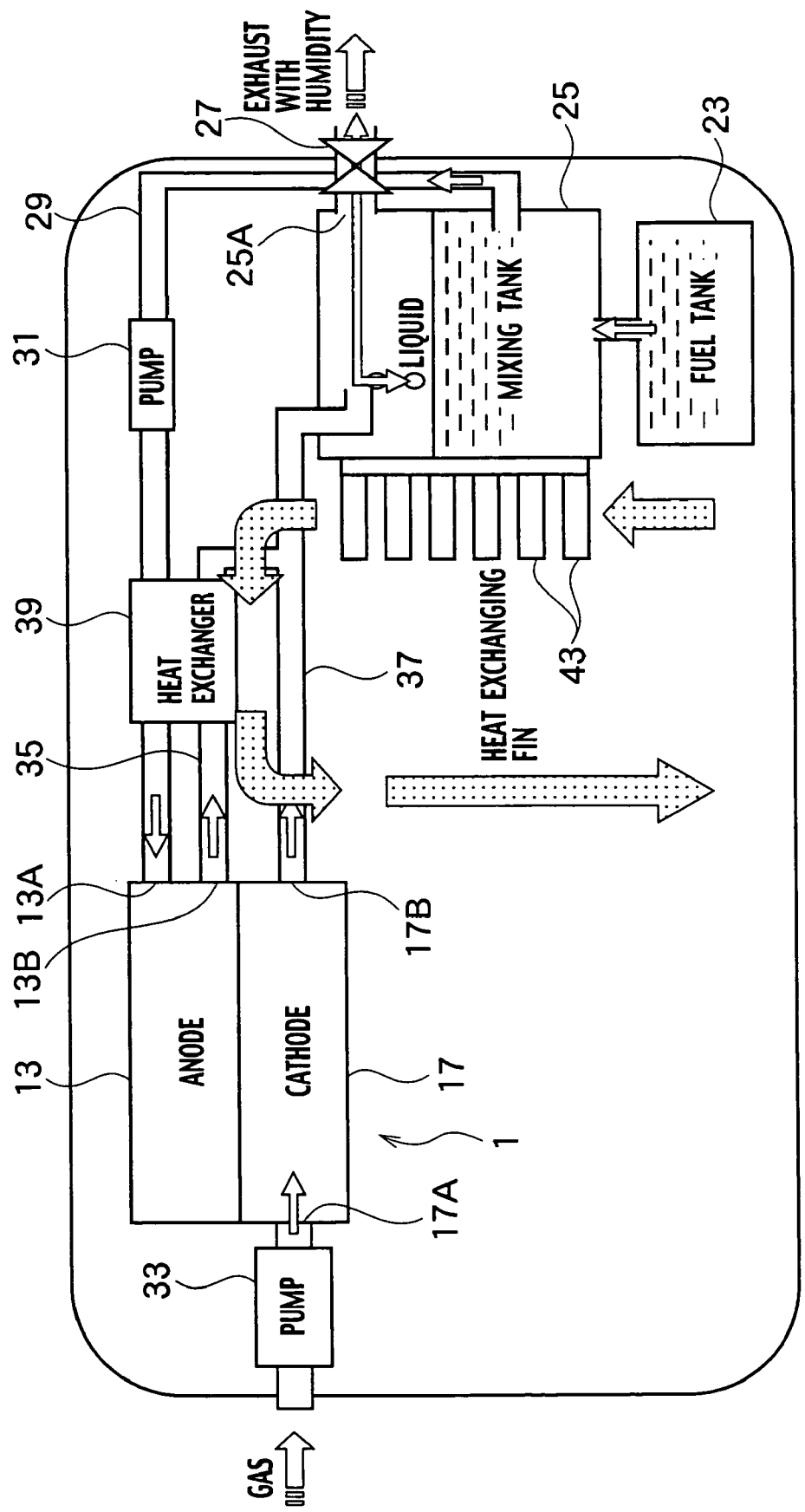
FIG. 15 is a schematic drawing of a fuel cell system according to a fifteenth embodiment of the present invention.

FIG. 15 shows a constitution of a fifteenth embodiment, which the constitutions of the second embodiment and the fourth embodiment are combined to form.

Figure 16:
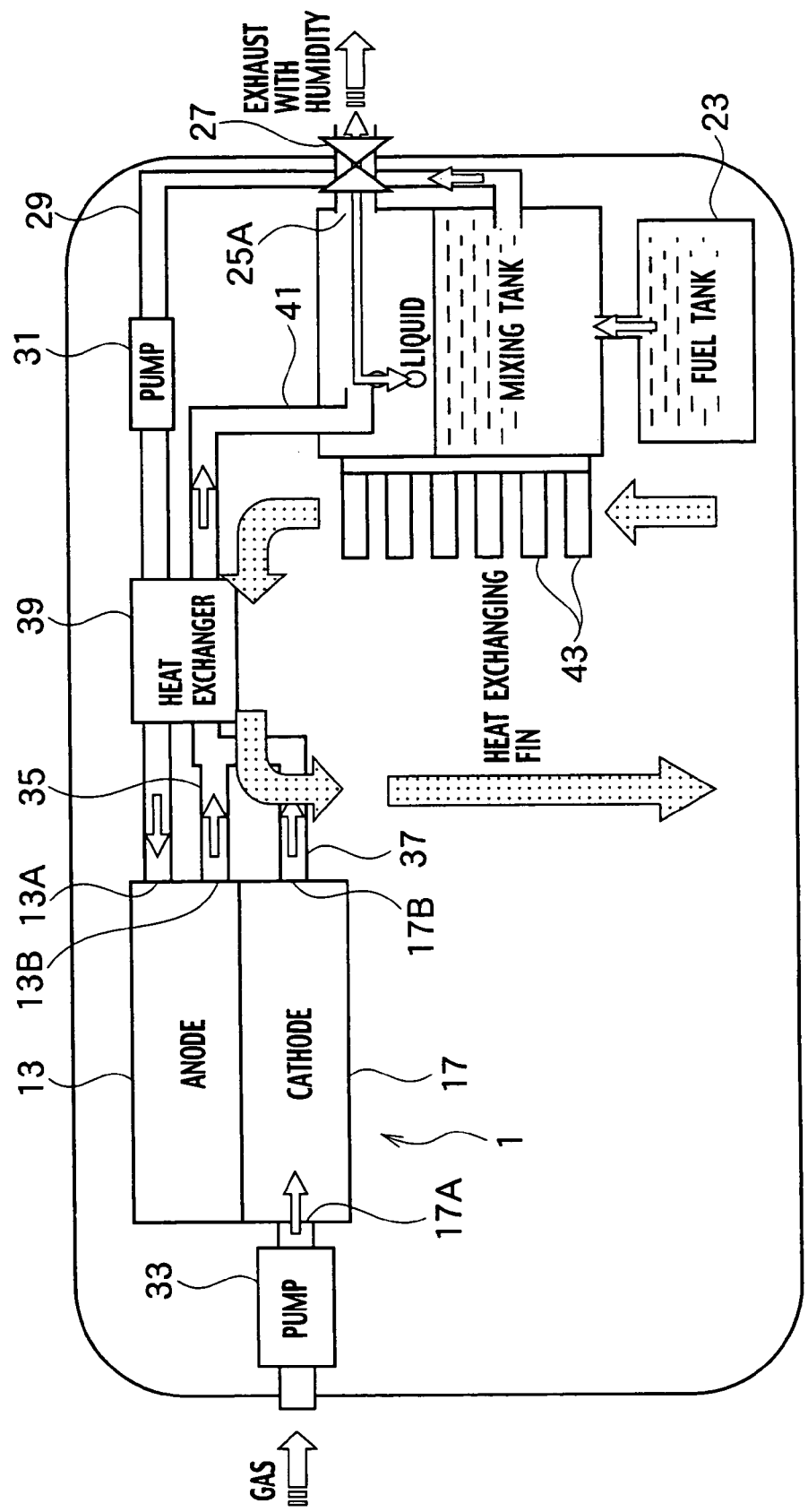
FIG. 16 is a schematic drawing of a fuel cell system according to a sixteenth embodiment of the present invention.

FIG. 16 shows a constitution of a sixteenth embodiment, which the constitutions of third embodiment and the fourth embodiment are combined to form.

Figure 17:
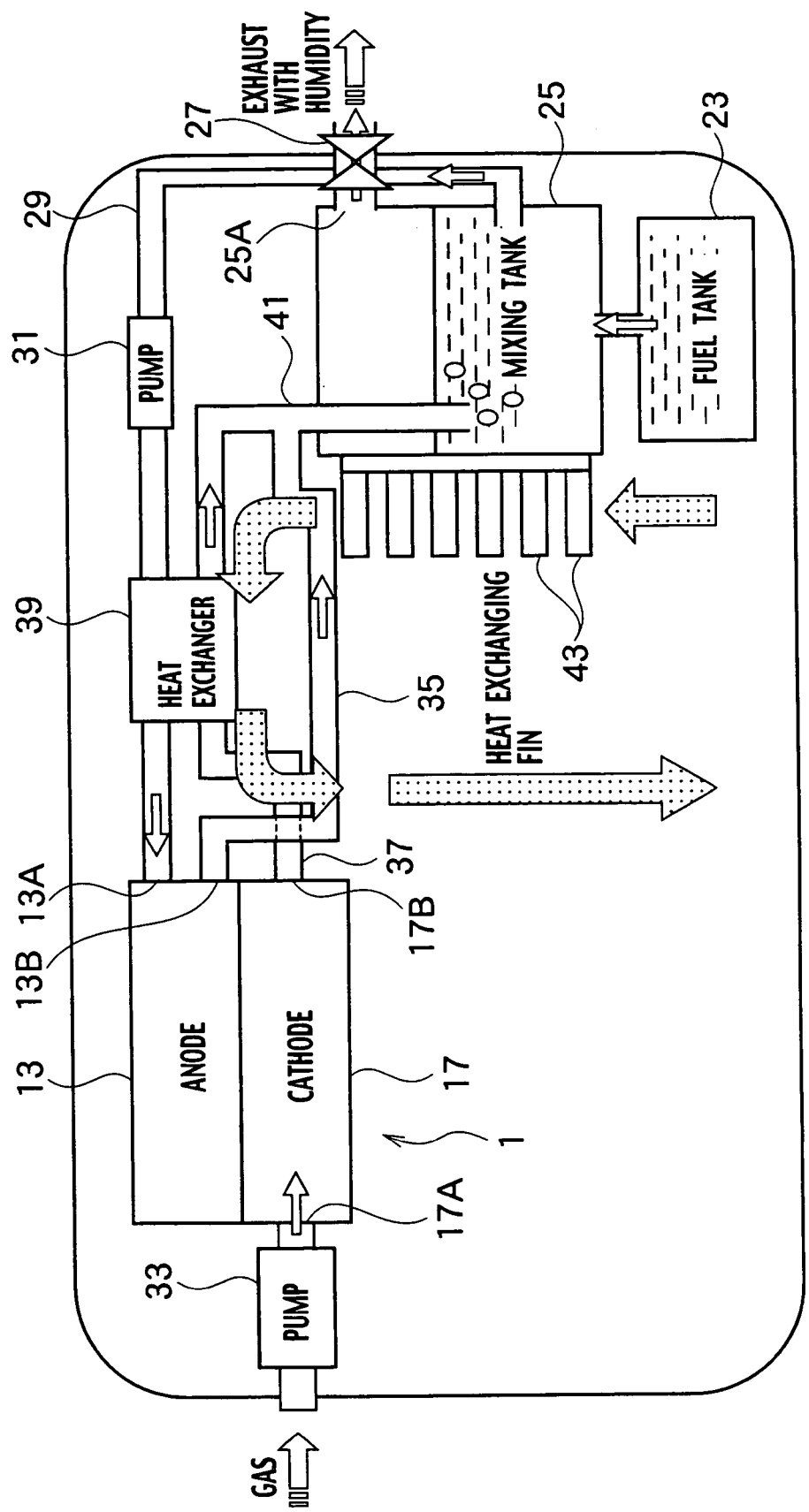
FIG. 17 is a schematic drawing of a fuel cell system according to a seventeenth embodiment of the present invention.

FIG. 17 shows a constitution of a seventeenth embodiment, which the constitutions of the first embodiment and the seventh embodiment are combined and the fan 45 is omitted to form.

Figure 18:
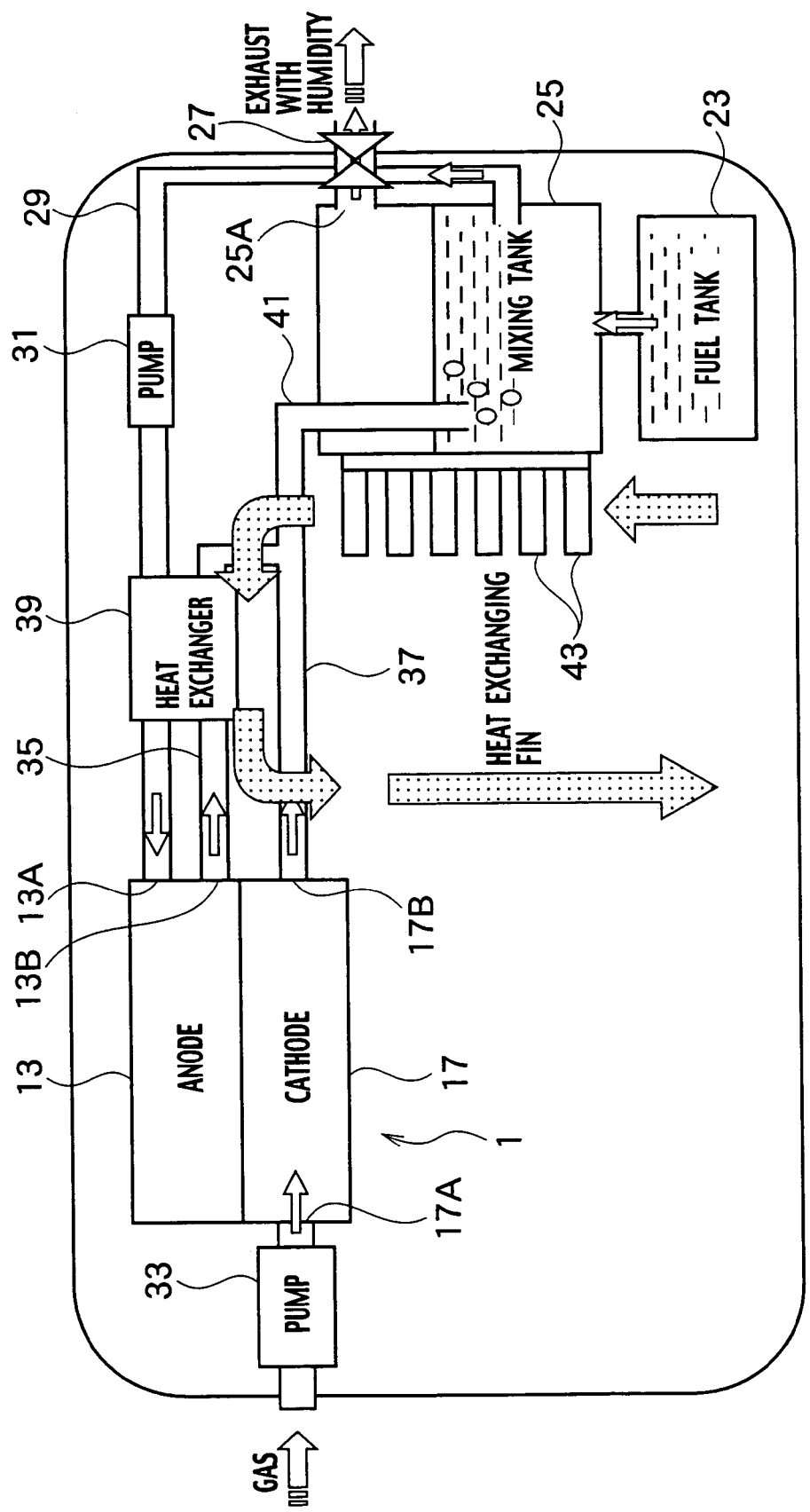
FIG. 18 is a schematic drawing of a fuel cell system according to an eighteenth embodiment of the present invention.

FIG. 18 shows a constitution of a eighteenth embodiment, which the constitutions of the second embodiment and the seventh embodiment are combined and the fan 45 is omitted to form.

Figure 19:
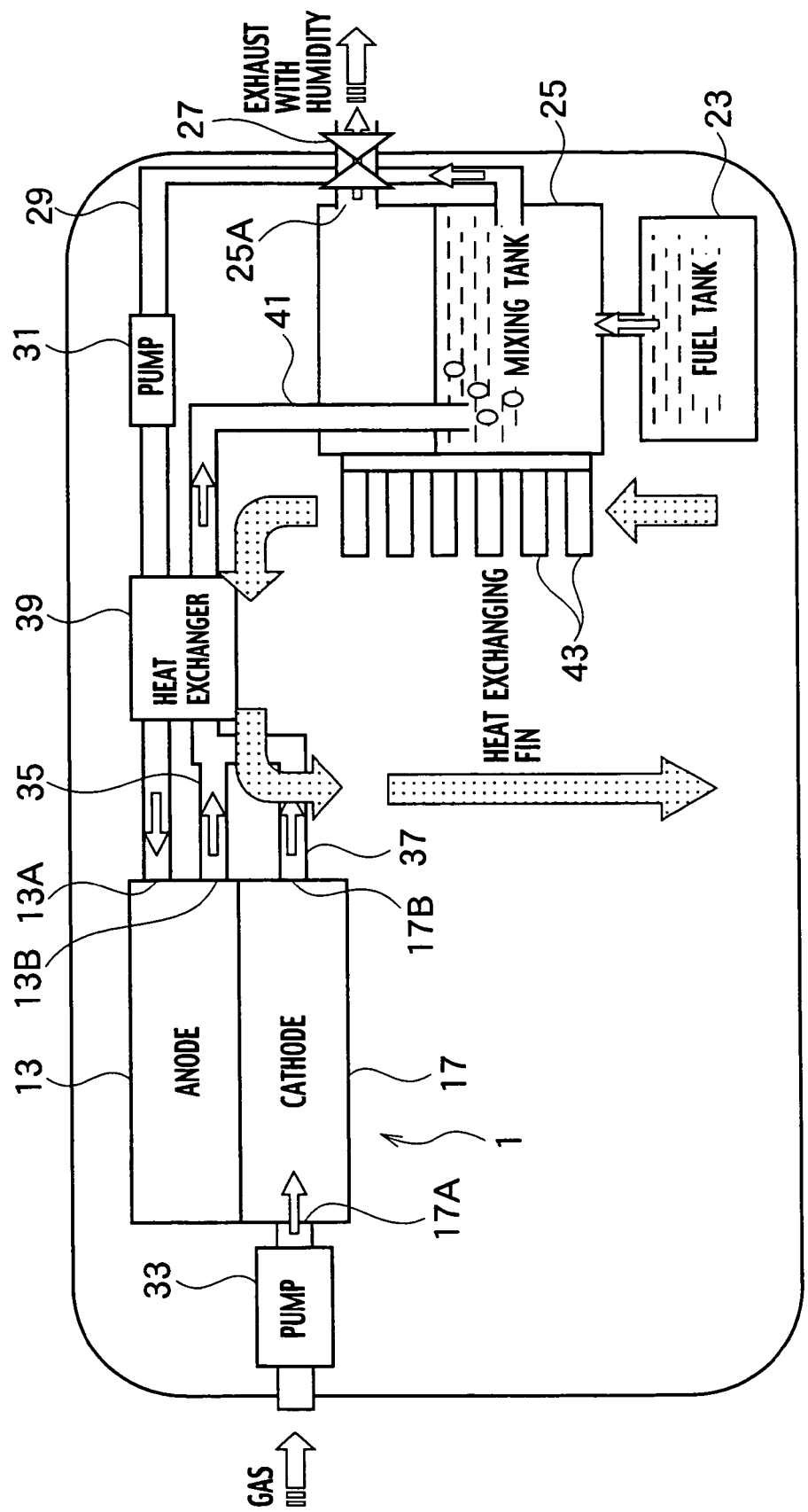
FIG. 19 is a schematic drawing of a fuel cell system according to a nineteenth embodiment of the present invention.

FIG. 19 shows a constitution of a nineteenth embodiment, which the constitutions of the third embodiment and the seventh embodiment are combined and the fan 45 is omitted to form.

Figure 20:
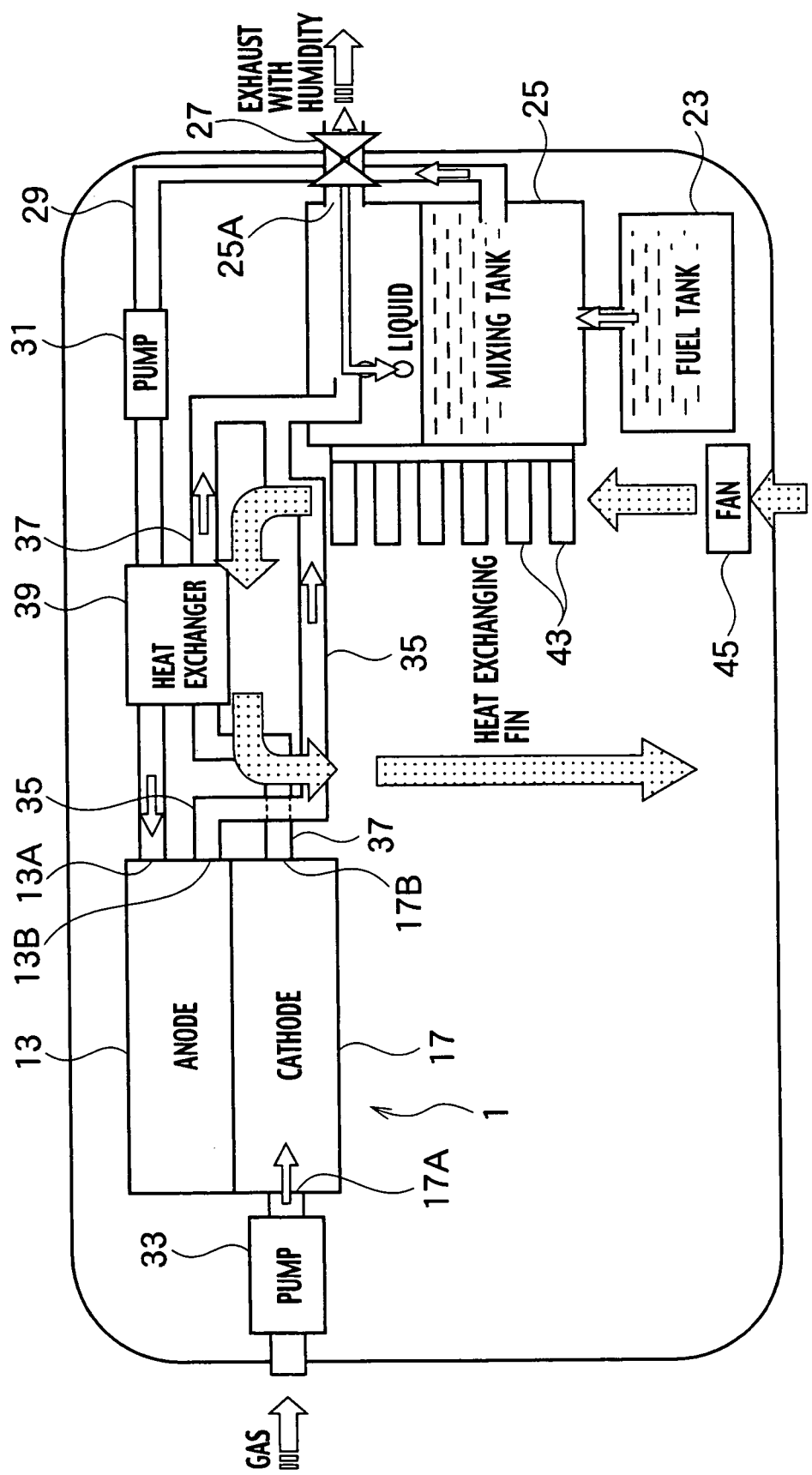
FIG. 20 is a schematic drawing of a fuel cell system according to a twentieth embodiment of the present invention.

FIG. 20 shows a constitution of a twentieth embodiment, which the constitutions of the first embodiment and the fifth embodiment are combined to form.

Figure 21:
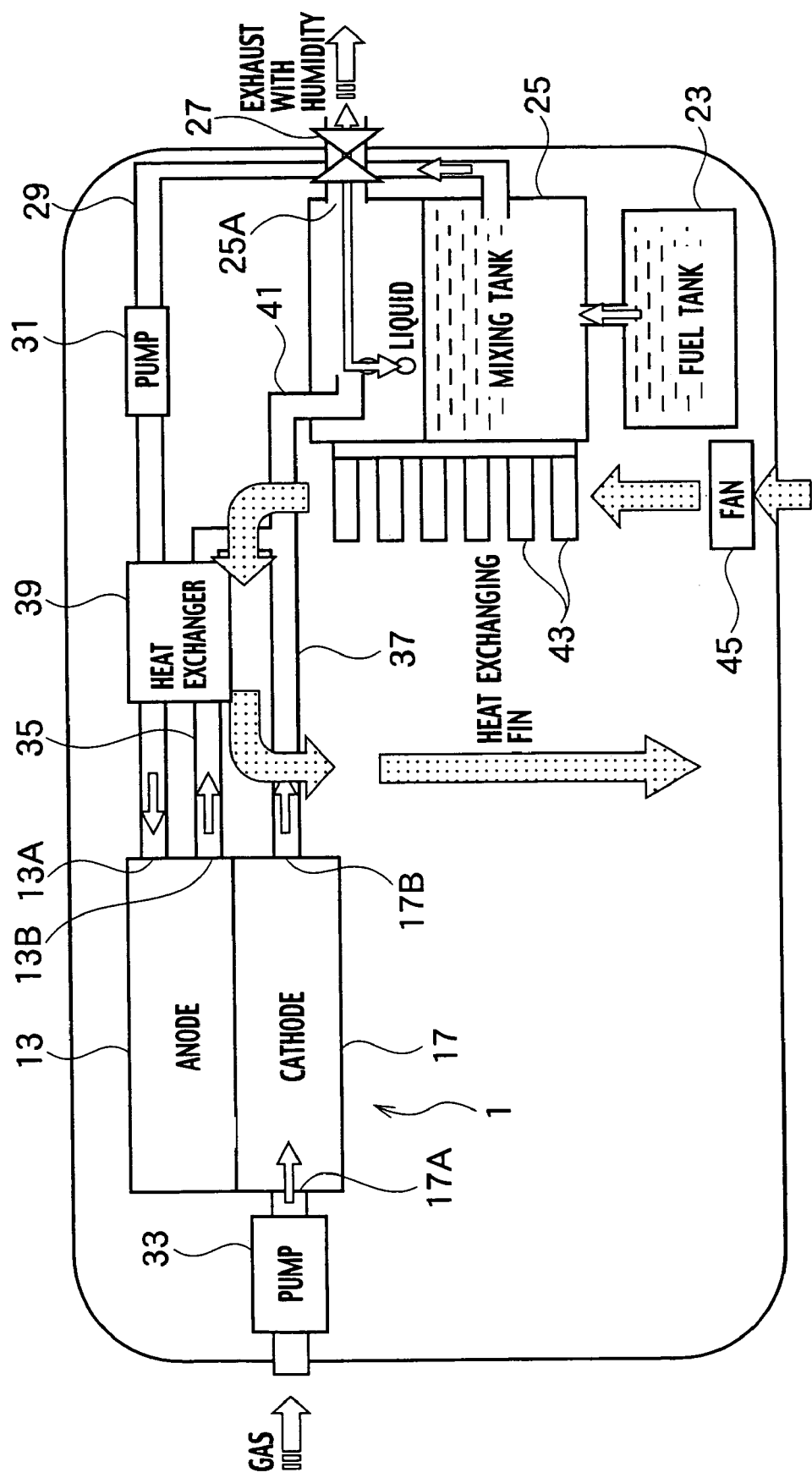
FIG. 21 is a schematic drawing of a fuel cell system according to a twenty-first embodiment of the present invention.

FIG. 21 shows a constitution of a twenty-first embodiment, which the constitutions of the second embodiment and the fifth embodiment are combined to form.

Figure 22:
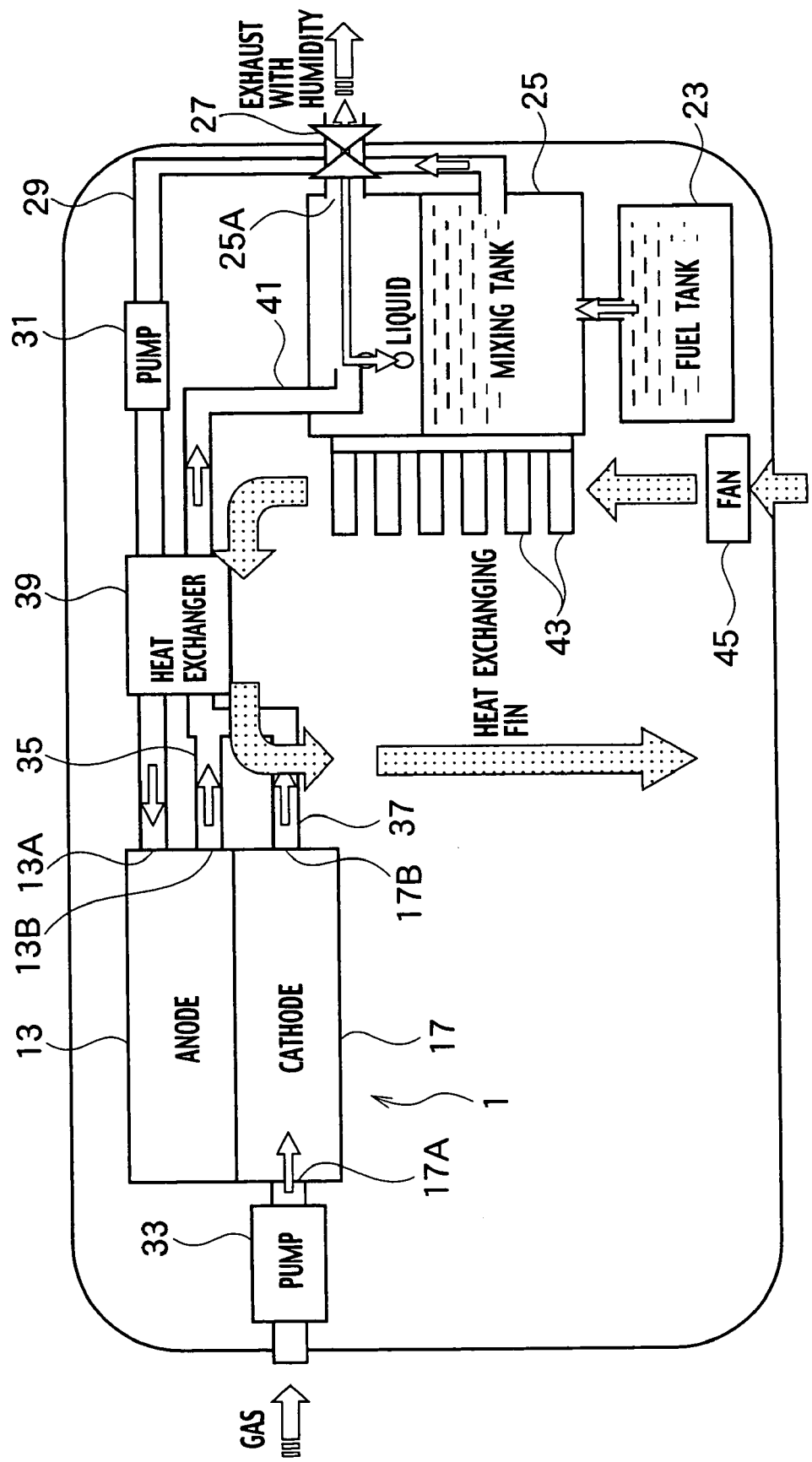
FIG. 22 is a schematic drawing of a fuel cell system according to a twenty-second embodiment of the present invention.

FIG. 22 shows a constitution of a twenty-second embodiment, which the constitutions of the third embodiment and the fifth embodiment are combined to form.

Figure 23:
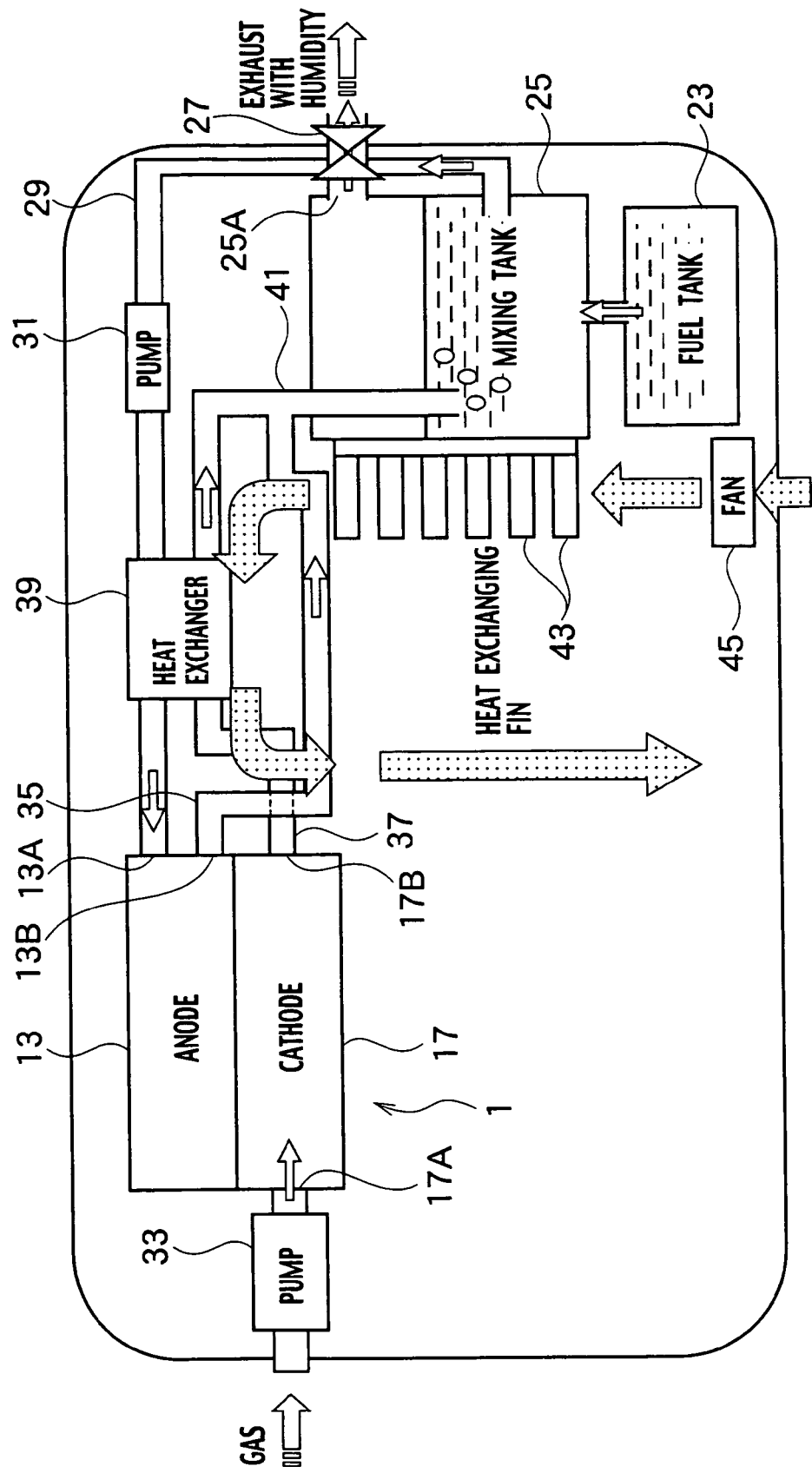
FIG. 23 is a schematic drawing of a fuel cell system according to a twenty-third embodiment of the present invention.

FIG. 23 shows a constitution of a twenty-third embodiment, which the constitutions of the first embodiment and the seventh embodiment are combined to form.

Figure 24:
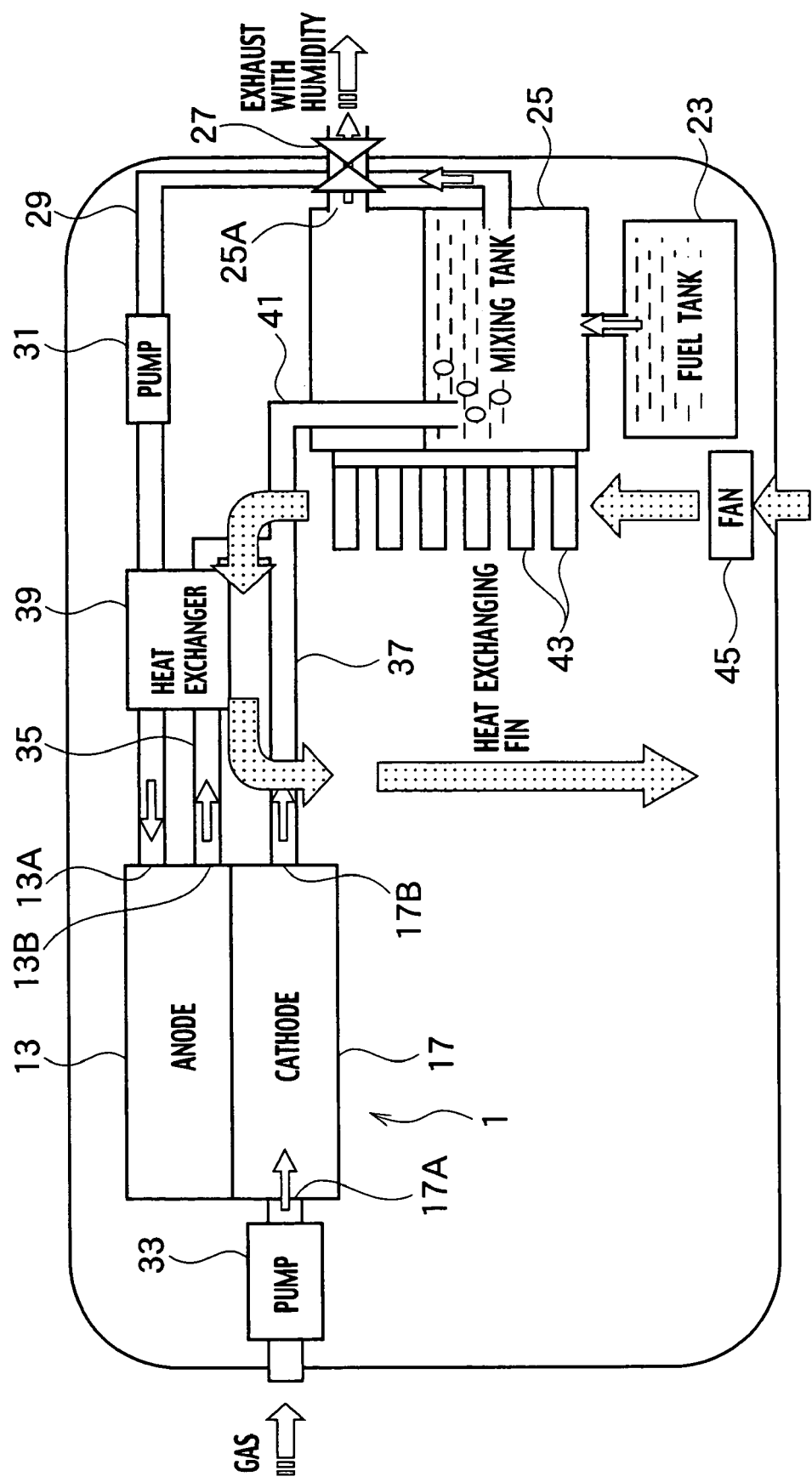
FIG. 24 is a schematic drawing of a fuel cell system according to a twenty-fourth embodiment of the present invention.

FIG. 24 shows a constitution of a twenty-fourth embodiment, which the constitutions of the second embodiment and the seventh embodiment are combined to form.

Figure 25:
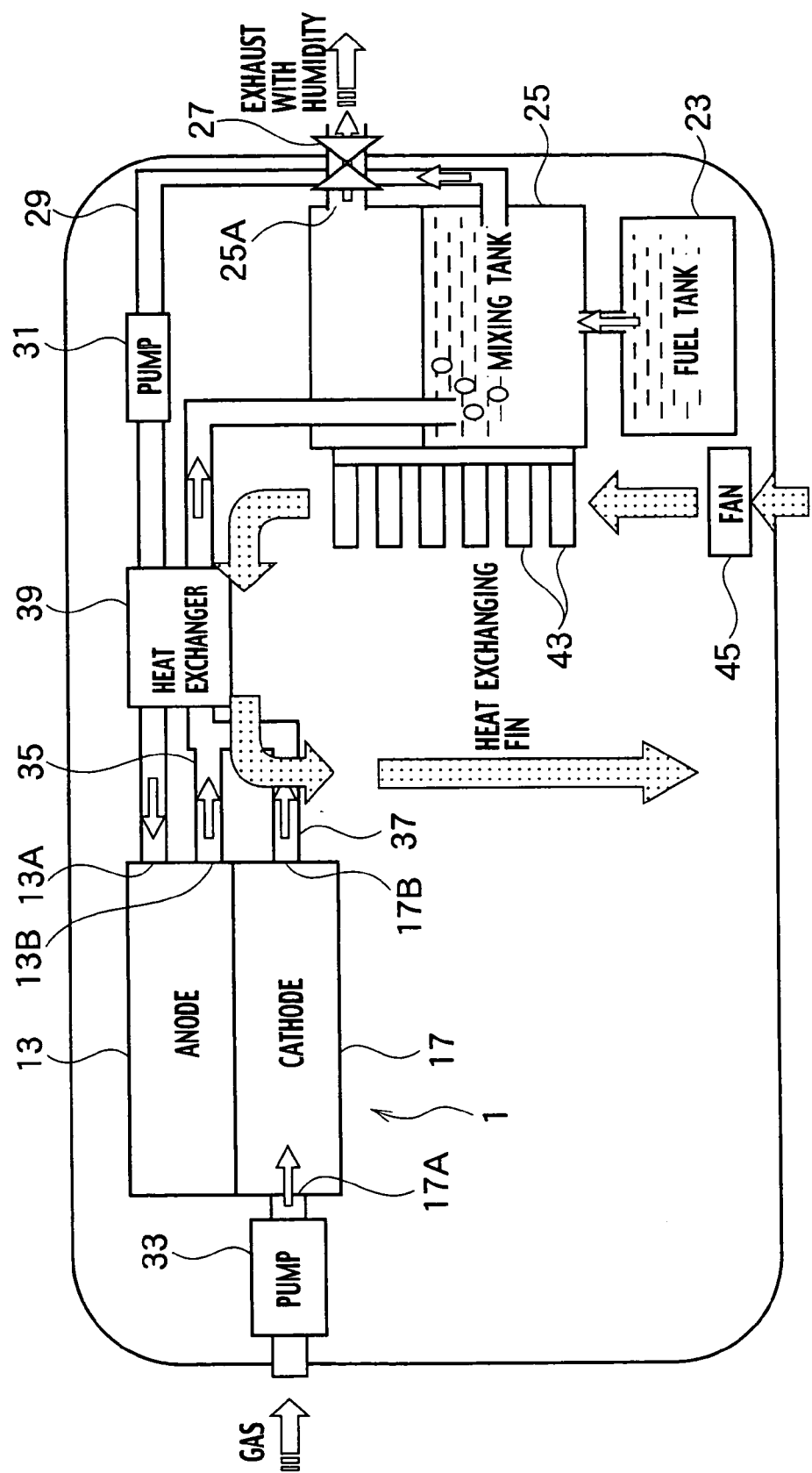
FIG. 25 is a schematic drawing of a fuel cell system according to a twenty-fifth embodiment of the present invention.

FIG. 25 shows a constitution of a twenty-fifth embodiment, which the constitutions of the third embodiment and the seventh embodiment are combined to form.

Figure 26:
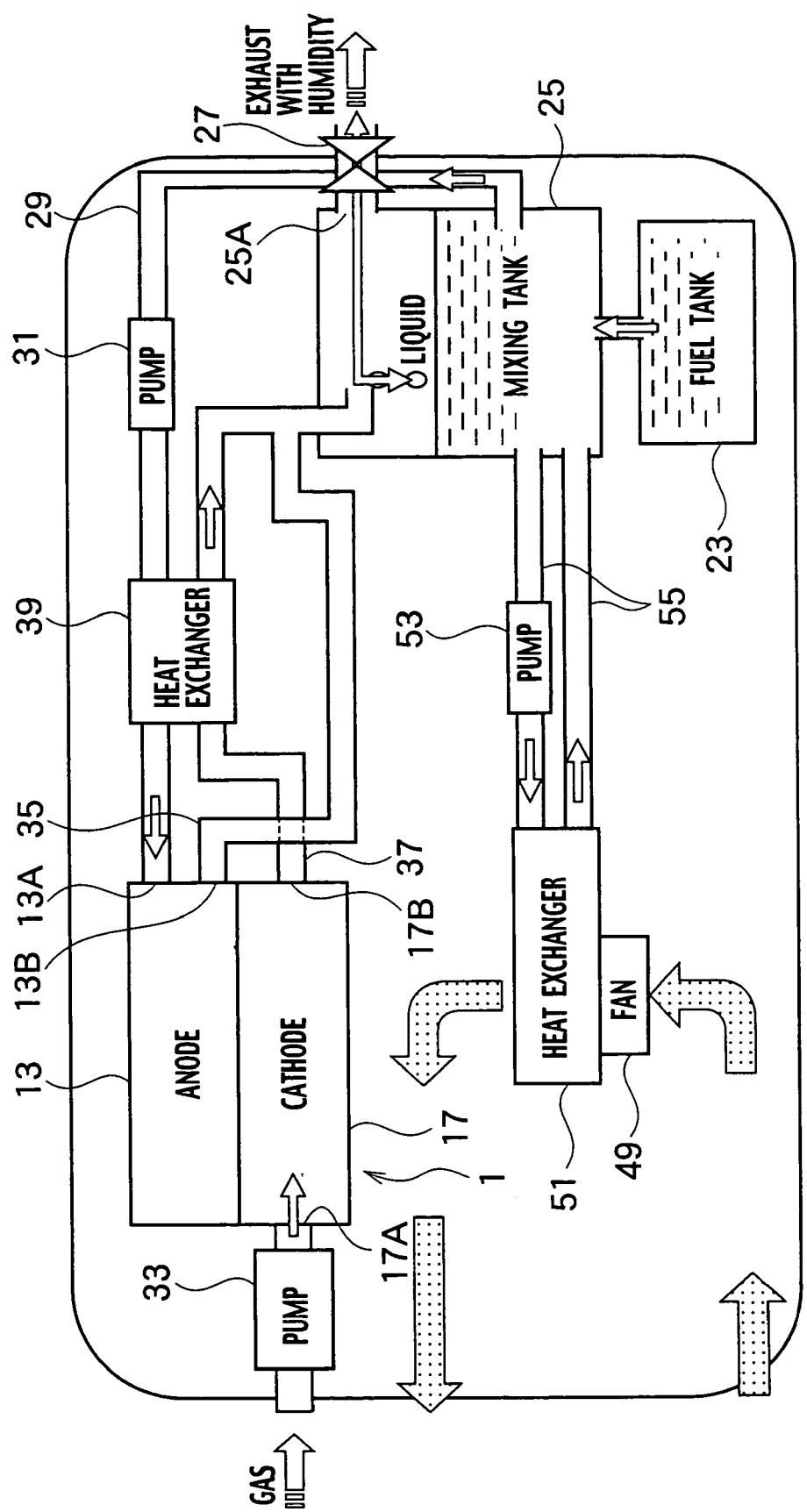
FIG. 26 is a schematic drawing of a fuel cell system according to a twenty-sixth embodiment of the present invention.

FIG. 26 shows a constitution of a twenty-sixth embodiment, which the constitutions of the first embodiment and the eighth embodiment are combined to form.

Figure 27:
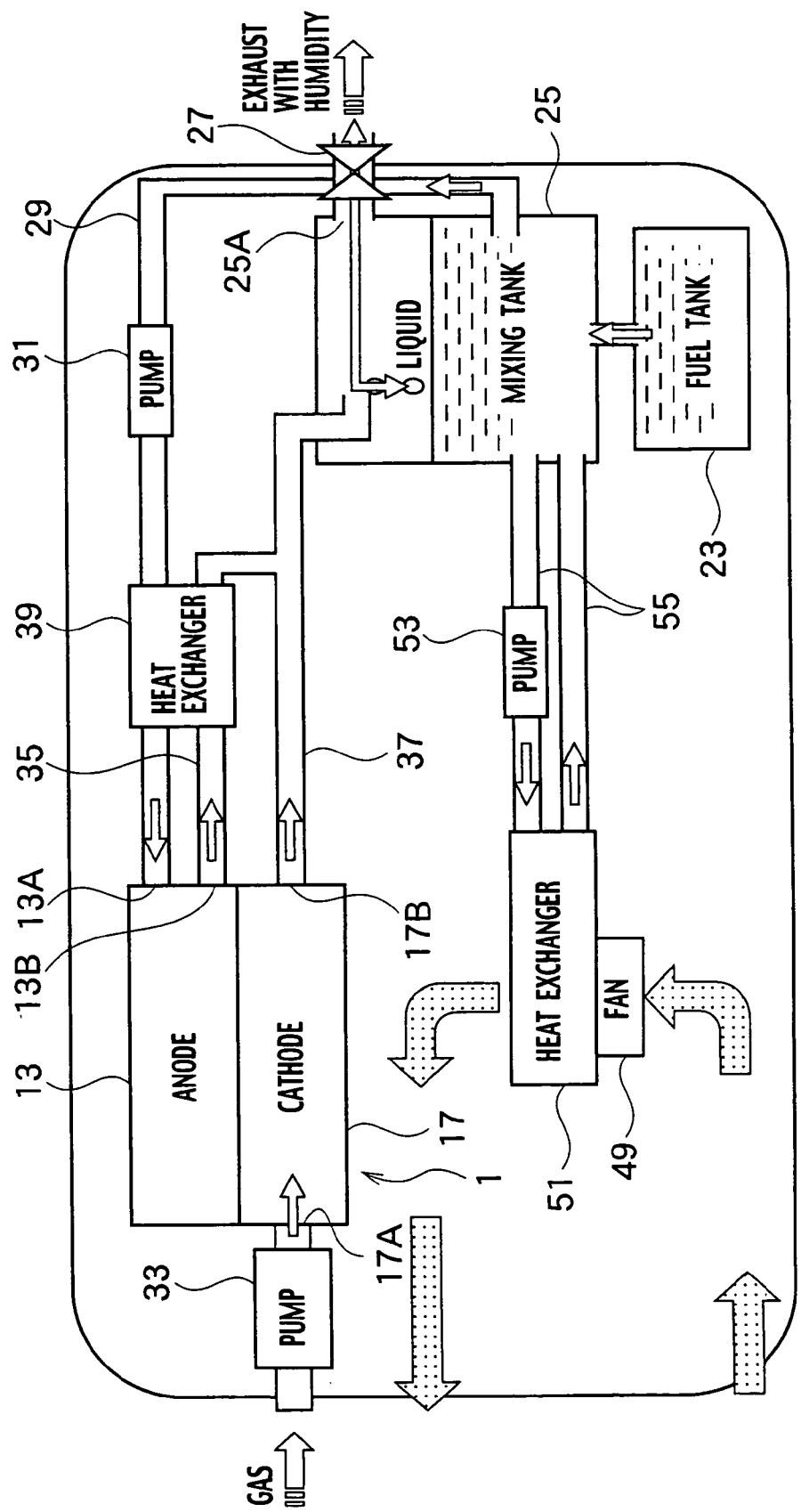
FIG. 27 is a schematic drawing of a fuel cell system according to a twenty-seventh embodiment of the present invention.

FIG. 27 shows a constitution of a twenty-seventh embodiment, which the constitutions of the second embodiment and the eighth embodiment are combined to form.

Figure 28:
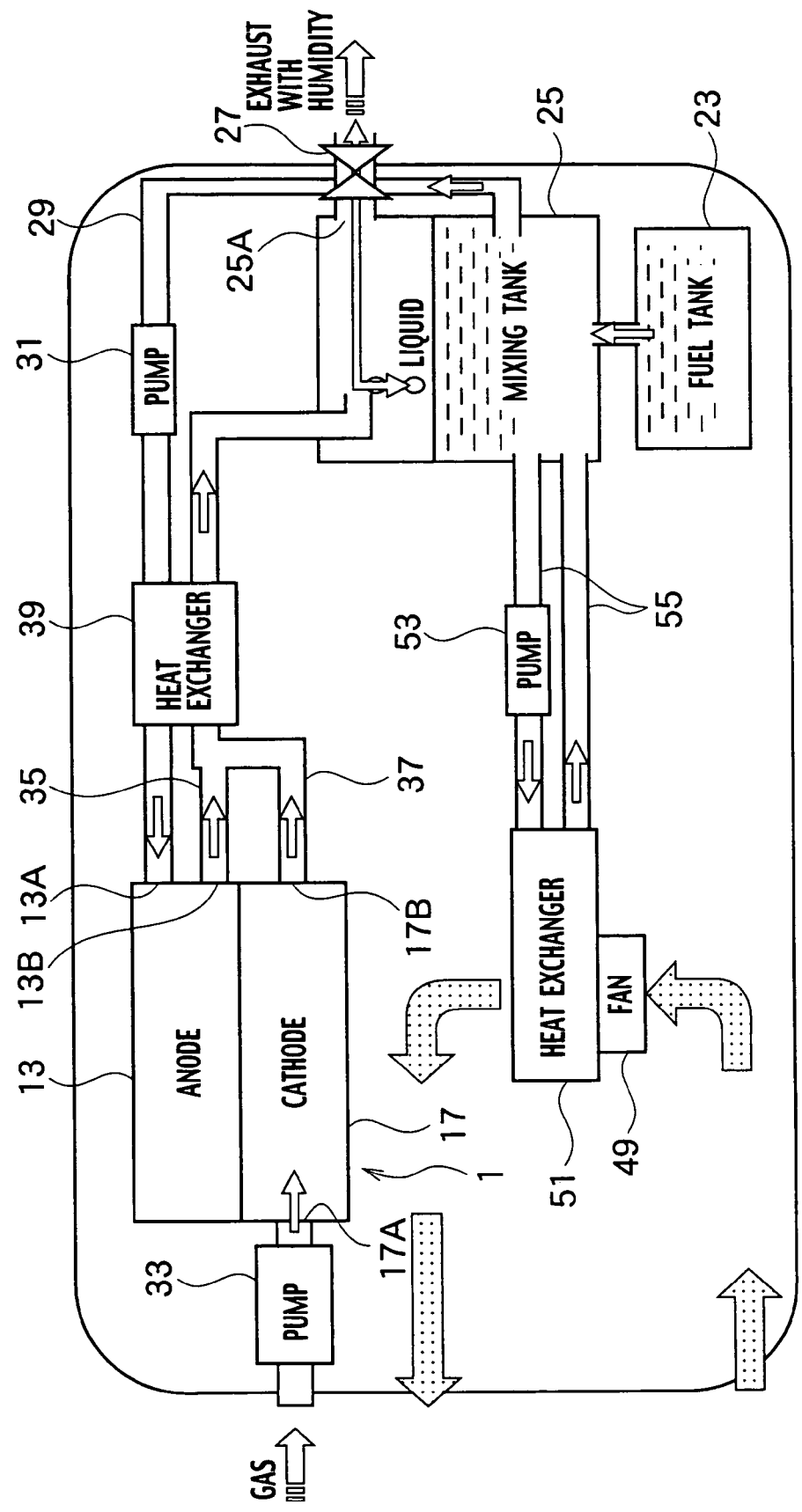
FIG. 28 is a schematic drawing of a fuel cell system according to a twenty-eighth embodiment of the present invention.
Figure 29:
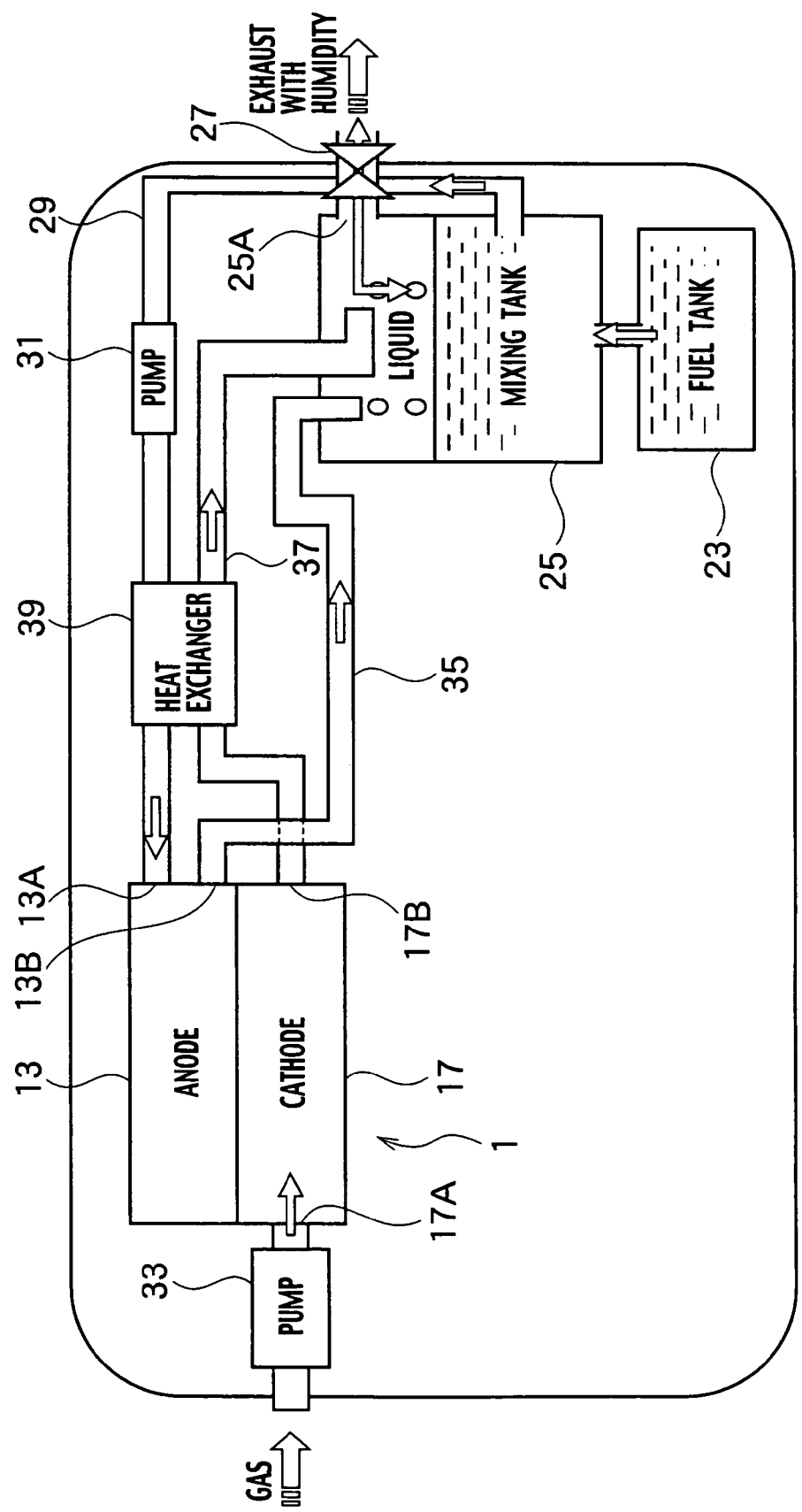
FIG. 29 is a schematic drawing of a fuel cell system according to a twenty-ninth embodiment of the present invention.

FIG. 28 shows a constitution of a twenty-eighth embodiment, which the constitutions of the third embodiment and the eighth embodiment are combined to form.

Any of the constitutions of the aforementioned embodiments from the twelfth to the twenty-eighth brings about combined effects of the corresponding base embodiments. Of course, the other combinations can be possible.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A fuel cell system comprising:
a direct organic liquid feed fuel cell having an anode, a cathode and an electrolyte membrane put therebetween;
a fuel supply unit including a mixing container mixing liquid fuel and an exhaust exhausted from the direct organic liquid feed fuel cell so as to form a liquid mixture, the liquid mixture being supplied to the anode;
an air supply unit supplying air to the cathode; and
a heat exchanger connected to the mixing container so as to exchange heat between ambient air and the liquid mixture in the mixing container.

2. The fuel cell system of claim 1, wherein:
the mixing container is configured so that the exhaust passes through the liquid mixture housed in the mixing container, such that gas fractions in the exhaust are separated.

3. The fuel cell system of claim 1, further comprising:
a second mixing container communicated with the mixing container wherein the liquid mixture is supplied from the second mixing container to the anode.

4. The fuel cell system of claim 1, further comprising:
a second heat exchanger exchanging heat between the liquid mixture supplied by the fuel supply unit and an exhaust exhausted from the anode.

5. The fuel cell system of claim 1, further comprising:
a second heat exchanger exchanging heat between the liquid mixture supplied by the fuel supply unit and an exhaust exhausted from the cathode.

6. The fuel cell system of claim 1, further comprising:
a second heat exchanger exchanging heat between the liquid mixture supplied by the fuel supply unit and an exhaust exhausted from the cathode and the anode.

7. The fuel cell system of claim 1, wherein:
the direct organic liquid feed fuel cell is a direct liquid methanol fuel cell.

8. A fuel cell system comprising:
a direct organic liquid feed fuel cell having an anode, a cathode and an electrolyte membrane put therebetween;
a fuel supply unit including a mixing container mixing liquid fuel and an exhaust exhausted from the direct organic liquid feed fuel cell so as to form a liquid mixture, the liquid mixture being supplied to the anode;
an air supply unit supplying air to the cathode;
a heat exchanger exposed to an ambient air; and
a circulation unit circulating the liquid mixture between the mixing container and the heat exchanger so as to exchange heat between the ambient air and the liquid mixture in the mixing container.

9. The fuel cell system of claim 8, wherein:
the mixing container is configured so that the exhaust passes through the liquid mixture housed in the mixing container, such that gas fractions in the exhaust are separated.

10. The fuel cell system of claim 8, further comprising:
a second mixing container communicated with the mixing container wherein the liquid mixture is supplied from the second mixing container to the anode.

11. The fuel cell system of claim 8, further comprising:
a second heat exchanger exchanging heat between the liquid mixture supplied by the fuel supply unit and an exhaust exhausted from the anode.

12. The fuel cell system of claim 8, further comprising:
a second heat exchanger exchanging heat between the liquid mixture supplied by the fuel supply unit and an exhaust exhausted from the cathode.

13. The fuel cell system of claim 8, further comprising:
a second heat exchanger exchanging heat between the liquid mixture supplied by the fuel supply unit and an exhaust exhausted from the cathode and the anode.

14. The fuel cell system of claim 8, wherein:
the direct organic liquid feed fuel cell is a direct liquid methanol fuel cell.

* * * * *